Durward F. Searcy
Thomas W. Scott
INVENTORS
BY J. Vincent Martin
Joe E. Edwards
McHarvey Gay
ATTORNEYS

COMPUTER

Filed March 31, 1964

Durward F. Searcy
Thomas W. Scott
INVENTORS
BY J. Vincent Martin
Joe E. Edwards
Jm Harvey Gay
ATTORNEYS

COMPUTER

Filed March 31, 1964 7 Sheets-Sheet 3

Durward F. Searcy
Thomas W. Scott
INVENTORS
BY J. Vincent Martin
Joe E. Edwards
M. Harvey Gay
ATTORNEYS Durward F. Searcy
Thomas W. Scott
INVENTORS
BY J. Vincent Martin
Joe E. Edwards
M. Harvey Gay
ATTORNEYS

COMPUTER

Filed March 31, 1964

Durward F. Searcy
Thomas W. Scott
INVENTORS
BY J. Vincent Martin
Joe E. Edwards
M. Harvey Gay
ATTORNEYS Jan. 3, 1967 D. F. SEARCY ETAL 3,296,420

COMPUTER

Filed March 31, 1964 7 Sheets-Sheet 6

Durward F. Searcy
Thomas W. Scott
INVENTORS

BY J. Vincent Martin
Joe E. Edwards
M. Harvey Gay
ATTORNEYS

Jan. 3, 1967 D. F. SEARCY ETAL 3,296,420

COMPUTER

Filed March 31, 1964 7 Sheets-Sheet 7

INVENTORS

Durward F. Searcy

Thomas W. Scott

BY Adolph C. Hugin

ATTORNEY

United States Patent Office 3,296,420

Patented Jan. 3, 1967

3,296,420

COMPUTER

Durward F. Searcy and Thomas W. Scott, Shreveport, La., assignors to United Gas Corporation, a corporation of Delaware Filed Mar. 31, 1964, Ser. No. 359,541

29 Claims. (Cl. 235—61.6)

This application is a continuation-in-part of application Serial No. 756,503, filed August 21, 1958, now abandoned.

This invention relates to computers and methods and apparatus for reading charts and more particularly to charts wherein time is plotted against a variable. The apparatus and methods are particularly useful in reading charts having two traces and in computing the square root of the product of the values represented by the two traces.

Flow of natural gas through a pipeline is measured by comparing the static pressure with differential pressure across an orifice in the line. These two variables are recorded on charts, usually circular, as a function of time. The instantaneous flow rate in the line varies as the square root of the product of these two pressures. The total accumulated flow during any period of time is the integral of the instantaneous flow rate integrated over the desired period.

The presently used method of extracting the recorded information from the circular chart and making the necessary integral-of-the-square-root-of-the-product computation involves the use of a manually operated mechanical computer commonly called an "integrator." To use this device the operator must manually retrace the two pressure lines on the chart with two independently mounted inking pens. The pressure levels thus sensed by the inking pens are used as inputs to a mechanical analog computer which integrates the information on the chart.

The speed at which the chart rotates in this procedure is continuously controlled by the operator with a foot pedal. Of course the two following pens are simultaneously moved one by each band of the operator. This method of interpreting the chart requires that the operator coordinate three rather difficult motions and, consequently, is subject to much human error even when employed by an experienced operator. The method is also very time-consuming.

It is an object of this invention to provide an apparatus for automatically scanning a chart of the type referred to above and determining from the chart the total cumulative flow.

Another object is to provide an apparatus for automaticaly reading a chart having two traces and determining the square root of the product of the values represented by these two traces.

A further object is to provide an automatic scanning device which correlates successives scans of a chart with a coded member to permit various computations to be made from the coded member.

Another object is to provide a binary computer for determining the square root of the product of two values.

Yet another object is to provide a coded device for generating at logarithmic signal determined by two variables, in combination with a computer which will determine the square root of the product of the two variables.

Another object is to provide an apparatus for determining the square root of the product of two variables read automatically from a chart in which successive readings are taken at successive time intervals, and wherein the last good reading is substituted for any bad reading until a new good reading is taken.

A yet further object is to provide an apparatus for generating a logarithmic signal and making computations with the logarithmic signal in which the logarithmic curve being generated is substantially straightened out.

Another object is to provide an apparatus for converting linear values into logarithmic values, making computations with the logarithmic values and extracting the antilog thereof in a computer, in which a coded member is utilized for generating the logarithmic signal and the coded member generates successive series of short sections of a logarithmic curve to the base 2 and introduces a binary factor into the computer which varies with each successive group of repeating logarithmic signals generated by the coded member or disc whereby the logarithmic curve being measured is substantially straightened out.

Other objects, features and advantages of the invention will appear from the drawings, the specification and the claims.

In practicing this invention, a chart having traces thereon is scanned with electromagnetic radiation means and the information obtained from the scanning is correlated with a coded member. It will be appreciated that one or more traces could be scanned and correlated with the code on the member for many purposes.

In making multiplication, division or power changes, the coded member will be provided with a logarithmic code, and a linear value determined by scanning the chart will be converted to its logarithm by the logarithmic code. Preferably a disc which is related in speed to the scanning mechanism is provided with this code.

In determining the square root of the product of two pressures recorded on a chart to thereby determine the flow rate of fluid through a line, the chart is scanned to determine the linear value of the pressures at successive times. These linear values are converted to their logarithms by the logarithmic signal generated by the coded member, preferably a disc. The signals generated by the scanning means are utilized to determine the length of the signal generated by the coded disc and these two logarithmic signals are fed into a computer which performs the computations. Preferably, this computer employs a binary counter for handling the logarithmic signals. After the logarithmic signals have been operated upon by the computer to determine $$\frac{\log X \text{ plus } \log Y}{2}$$

the binary counter remembers or stores this value. A second log signal then is generated by the coded disc, which second log signal is compared to the stored value. While the disc is generating the second log value, a linear signal also is being generated, the value of which is continuously instantaneously equal to the antilog of the concurrently instantaneously generated second log signal. When the second log signal equals the stored value, the binary counter emits a signal which stops the linear signal counter generation and thus gives the antilog of the computed stored value in the binary counter. This antilog signal is fed into an accumulator which accumulates successive antilogs computed by the device and after the desired number of scans have been made on the chart, the accumulated number represents the total of accumulated flow during the period of time covered by the chart. Of course, this figure must be corrected for temperature, gravity and orifice constant in the usual manner. Where one instrument is to be utilized in handling different type charts, it may also be necessary to introduce a chart factor.

On occasions, the two trace lines on a chart will cross each other and thus the scanner will only sense a single line. This would introduce a slight error into the reading. The scanner may also sense a third false trace due to dirt, etc., which would introduce error. To avoid this, a memory unit is provided which remembers or stores the computed antilog value of the last good scan, as seen by reference to FIG. 9, that is, one which scanned two trace lines. In the event the scanner senses only one or more than two trace lines, the apparatus rejects the computation of the binary counter and substitutes therefor the computation for the last good scan. This procedure is continued until the apparatus again scans two trace lines for a single scan.

It will be appreciated that a log curve flattens out very quickly and, therefore, difficulty will be experienced in generating a logarithmic signal with a disc of small size. In accordance with this invention, the logarithmic signal is generated in two parts. One signal is a series of short sections of a logarithmic curve to the base 2, and the other signal introduces a binary factor which substantially straightens out the curve.

In the drawings, wherein illustrative embodiments of this invention are shown and wherein like reference numerals indicate the like parts:

To determine gas flow, we wish to determine the sum of the logs of the two pressures, take one-half of this figure and determine the antilog of the figure so computed.

Figure 1:
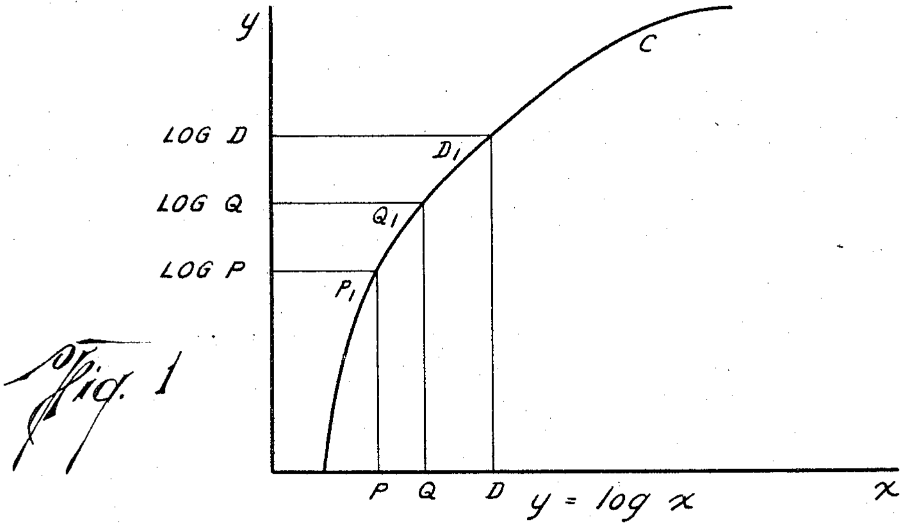
FIGURE 1 is a graph of a log curve with linear values represented along the X-axis and the logs thereof represented along the Y-axis.

Referring to FIGURE 1, there is shown a plot of a log curve in which Y is equal to the log of X. Along the axis X we may plot in the linear value of P and the linear value of D and determine their position $P_1$ and $D_1$, on the log curve. We may then plot in the logarithms of values along the Y axis.

Inasmuch as $$Q=\sqrt{PD}$$

and $$\log Q=\frac{\log P+\log D}{2}$$

$$\log Q=\frac{\log P+(\log D-\log P)}{2}$$

the log of Q may be determined by measuring one-half of the distance between log P and log D on the Y axis. Then by determining this value $Q_1$ on the log curve, we may read from the X axis the value of Q.

Divisional application Ser. No. 273,079, Durward F. Searcy and Thomas W. Scott, for Computer, filed Apr. 15, 1963, is directed to a computer for deriving results of this type.

Figures 2, 3:
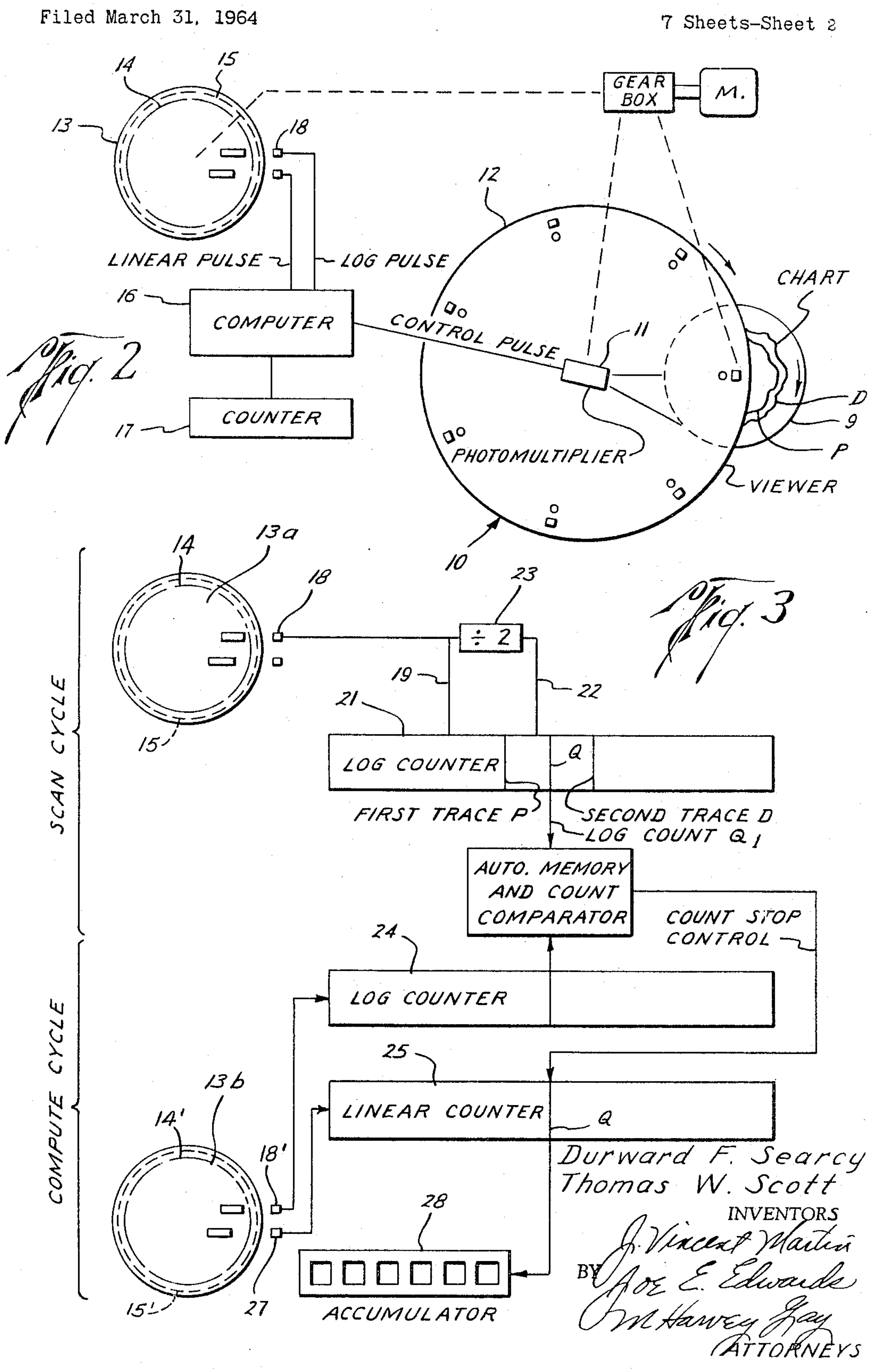
FIGURE 2 is a diagrammatic representation of an apparatus for carrying out this invention.
FIGURE 3 is a diagrammatic representation of the coded disc computer preferred for use with this invention.

The method of automatically measuring the linear value of two pressures, performing the computation shown in FIGURE 1 and extracting the antilog of the computed value in accordance with this invention is illustrated diagrammatically in FIGURE 2. In this device a circular chart 9 is rotated slowly along its time axis. A scanning device indicated generally at 10 and having an electromagnetic radiation scanning means is moved along successive time increments of the chart 9 to measure the distance between each of the traces D and P from their zero reference point. Preferably this measurement is taken with a light sensitive means, such as the photomultiplier 11 and associate lenses and mirrors, which will be explained more fully hereinafter.

Geared to a disc 12, which moves the electromagnetic radiation sensitive means across the chart, is a coded member, such as coded disc 13. The rotating discs 12 and 13 are geared together to correlate signals from the photoelectric cell with the signals to be generated by the coded disc. The coded disc has thereon several codes, one of which is a logarithmic code 14 so that light passing through the logarithmic code holes will generate a logarithmic signal. Also on the disc is a linear code 15. The log code 14 is represented by the ordinate or Y axis coordinates and the linear code 15, being proportional to the axis of the variable (pressure), is represented by the abscissa or the X axis coordinates of FIGURE 1. From what has been explained, it will be seen that beginning rotation of code disc 13, at the zero point on the logarithmic and linear codes as the electromagnetic radiation sensitive means begins to scan the chart 9, will permit generation of a signal from the scanning means, at the time that a logarithmic signal has been generated, which is the log function of the linear value of the pressure at P. Thus, when the scanning device sends a control pulse to the computer, signaling that it has passed over the pressure trace P, the logarithmic value theretofore generated will be equal to the ordinate of P′ on the log curve of FIGURE 1.

Divisional application Ser. No. 273,081, Durward F. Searcy and Thomas W. Scott, for Computer Scanning Apparatus, filed Apr. 15, 1963, is directed to a scanning apparatus for providing such results.

Thereafter, the scanning device will signal that it has passed over the chart trace D, and, at that time, the logarithmic signal which has been generated will be equal to the log value at point $D_1$ of FIGURE 1.

These two log functions of $P_1$ and $D_1$ may be fed into a computer which will determine one-half of their sum, and thus determine the point of $Q_1$ on the log curve of FIGURE 1. Then the computer will determine the antilog of the point $Q_1$, and thus determine the linear value of Q. A computer for performing this function is represented at 16. The antilog thus computed is fed into a decimal counter, represented at 17, which integrates successive readings of the chart. Usually there will be a large number of these readings on each chart; for instance, as many as three or four hundred.

It will be noted that the scanning device reads from the center outward on chart 9. Thus, between chart scans, there is a period of time equal to the chart scan time. Preferably, the coded disc makes two revolutions for each chart scan and is utilized in a compute cycle as shown in FIGURE 3. In this figure, disc 13*a* represents the coded disc during the scan cycle, and disc 13*b* represents the coded disc during the compute cycle.

It is preferred that the log counters in FIGURE 3 be of the binary type, as they may be simply designed to make the desired computations. The log pulses are picked up by photoelectric cell 18 and fed into the log counter 21 from the log scale 14 during the scan cycle.

Pulses from the log track pass through the line 19 and into the binary counter 21 until the first signal is received from the scanning device 11. Thereafter, the line 19 is closed and log signals are sent through line 22, wherein they are divided by 2, as indicated schematically at 23. The divided by 2 signals are then introduced into the counter 21 until the second trace is encountered by the scanning device.

Inasmuch as only one-half of the signals between trace P and D are introduced, the log count will only go up to the point Q. Thus, at the completion of the scan cycle, there will be standing in the log counter a value equal to $Q_1$ on the log curve of FIGURE 1.

The computer then continues to operate, and the compute cycle proceeds, while the coded disc revolves through one revolution, and a second series of logarithmic pulses are generated. Preferably, these logarithmic signals are also generated by electromagnetic pulses or radiations, such as light pulses. The second log count is indicated schematically in FIGURE 3 as being picked up by the photoelectric cell 18' of the log counter 24. Actually photoelectric cell 18' may be the same cell 18 which picked up the log count during the scan cycle rotation of the coded disc 13. It is indicated as a separate cell in FIGURE 3 in order to simplify the schematic representation of the system. The computer is provided with a memory and automatic count comparator which signals when the log count picked up in counter 24 during the compute cycle is equal to the log count of $$\log P + \tfrac{1}{2}\ (\log D - \log P)$$

standing in the log counter 21 from the scan cycle. This signal trips the linear counter 25 which has been receiving linear pulses from the photoelectric cell 27 placed behind the linear track 15', and the linear count is stopped. This count is then transferred into the accumulator 28, where is is stored and integrated with subsequent counts made in like manner. Of course after a chart has been completely scanned, the value standing in the accumulator represents the total gas flow, when corrected with orifice and chart constants and for temperature and gravity.

As noted above, it is preferred to use a binary counter because this counter will readily lend itself to storing or remembering the scan log count and automatically comparing it with the compute log count. Such a binary counter is shown schematically in FIGURE 4. If we assume that the top row of digits represents a log scan of 95 impulses during the scan cycle, the computer or log counter would be set in the manner shown. Then if we complement the counter and change each of the digits to its opposite, as shown in the next lower line of the counter, the condition of the counter will be such that an additional count equal to the original log count of 95 will cause the maximum count to be present in the counter. This is represented by the next to the bottom line of digits. At this time, one additional impulse will return the counter to its original condition as indicated in the bottom line of digits. This characteristic of the binary counter may be utilized by taking an impulse from the binary counter returning to zero to trip the linear counter and stop any further count from reaching the linear counter. Thus it will be seen that it is not necessary to use two log counters, and a single binary counter may be utilized to make both log counts and to automatically compare the count.

Figure 4:
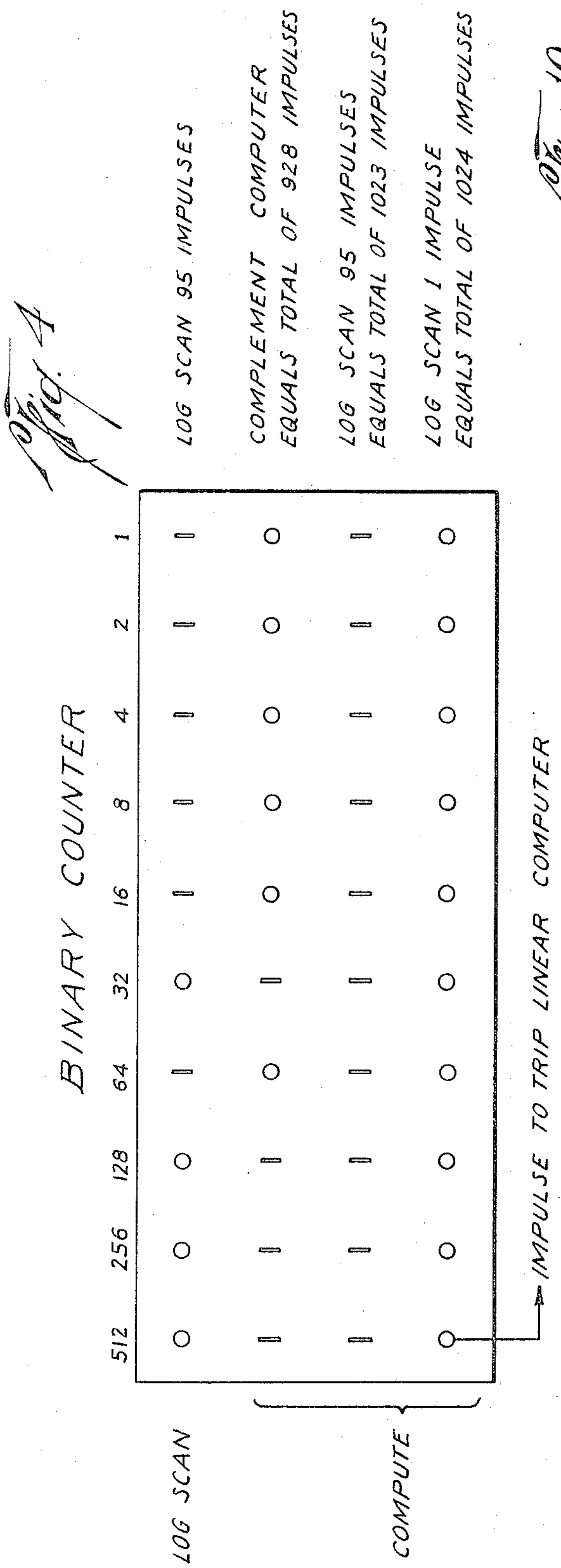
FIGURE 4 is a diagrammatic representation of a binary counter illustrating the manner in which the two log scans are compared to trip the linear counter when the second log scan is equal to the first log scan.

The binary counter schematically illustrated by FIGURE 4 may be combined with the coded disc to accomplish the desired functions. The binary counter may be simply and easily complemented by tripping a complementing device after the scan cycle has been completed and before the compute cycle has begun. This trip could be provided on either the coded disc or the scan disc. In the device illustrated, it is provided on the scan disc, as will be pointed out hereinafter. Thus, after the impulses from the log track during the scan cycle have been introduced into the binary counter, the counter is complemented by a signal from either the scanning device or the coded disc. Then during the compute cycle the log track again begins to introduce log signals into the counter. As soon as these signals are equal in number to those introduced during the scan cycle plus 1, the binary counter will trip and return to its zero condition. When this happens the impulse from the counter will trip the linear counter and the antilog Q of $Q_1$ (see FIGURE 1) will be stored in the accumulator. This antilog is correct for all practical purposes because the sum of the log signals plus 1 is substantially the same as the original scanned log signals, because the plus 1 signal is a relatively negligible quantity in computations of the magnitude of this type.

Referring now to FIGURES 6, 7, 8 and 11, the preferred form of scanner mechanism and coded disc is shown. The chart 9, which is to be read, is mounted on a chart table 30. The chart table is rotated through suitable gears in gear box 31. The drive for both the chart 9 and the chart scanner, as well as the coded disc 13, is from a motor 32. The coded disc 13 is mounted directly on the motor arbor and the output of the motor is passed through the large gear box 33 which drives the scan disc 12. The power for driving the chart table 30 is taken off from the large gear box 33. It will be appreciated that this arrangement relates to rotation of the coded disc 13, the scan disc 12, and the chart table 30.

The scan disc 12 is mounted to overlie the chart 9, and preferably is much larger than the chart 9, so that it may contain a number of electromagnetic radiation pickups, such as the photoelectric scanning device illustrated which is sensitive to electromagnetic radiations. Circular charts have their variable, such as pressure, represented by curved lines radiating from the center of the chart. Thus, the chart may be made to move around its axis so that the angular changes around this axis represent time. To read along the curved line representing the variable, the scan disc has optical pickups positioned a distance from the center of the scan disc equal to the radius of the lines representing the variable on the chart with the center of the scan disc at the center of curvature of these lines. Therefore, the optical pickups will travel along the time lines on the chart and the trace signals generated during each scan will represent pressures at a substantially common time.

The optical pickup system is provided by a plurality of lenses 34 which are equally spaced about the scan disc. These lenses project light through holes 35 in the scan disc. These holes are on the order of .015 inch in diameter. The light projected through holes 35 is reflected by mirrors 36 through lenses 37 toward the center of rotation of the scan disc. Of course, the entire assembly is within a light tight box 38, and no light is reflected except that received from the chart which is provided by a chart illuminator 39. This light will be picked up by the lenses as they pass over slot 40 in the bottom of the box 38.

Located approximately at the axis of rotation of the scan disc and directed toward the chart table is a photoelectric cell, such as the photomultiplier 11. The field of view of the photomultiplier begins approximately at the axis of rotation of the chart table and extends therefrom toward the periphery of the chart table. Thus, assuming the scan disc to rotate in a clockwise direction, the lenses will pass over the center of rotation of the chart table before they begin to transmit light which can be picked up by the photomultiplier. Then they will transmit light to the photomultiplier during the time that they pass from the center of the chart to the edge of the chart. As a lens passes over a trace on the chart, the light to the lens will be blocked out so that the amount of light passing to the photomultiplier will be reduced.

When this happens, the photomultiplier will generate a signal which is transmitted to the computer in a manner to be hereinafter explained.

Other signals also are generated by the scan disc for each scan cycle. One of these signals is generated by a pin 40′ passing between a lamp 41 and a photoelectric cell 42, and the other is generated by a pin 43 passing between the lamp 41 and a photoelectric cell 44. There are a plurality of these pins, with a pin 40′ immediately preceding each scan cycle. This pin generates a signal which resets the computer and makes certain that it is ready to begin a cycle. The other pins 43 generate a signal after each lens has completed its scan. The signal from this latter photoelectric cell is utilized to complement the counter.

Figures 10, 11:
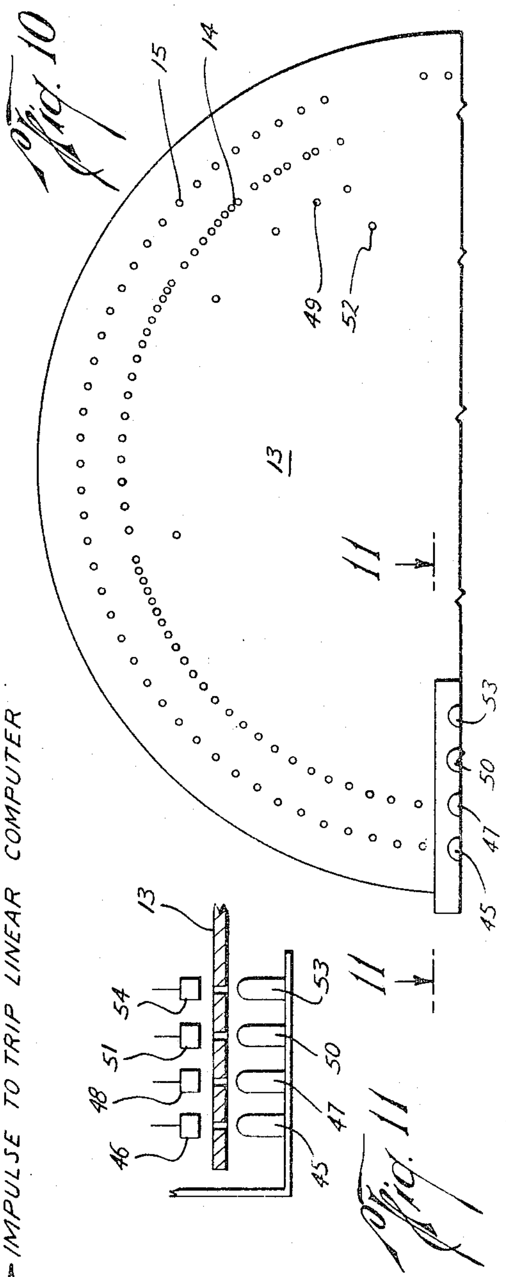
FIGURE 10 is a segment of the coded disc on an enlarged scale.
FIGURE 11 is a view along the lines 11—11 of FIGURE 10.
Figure 6:
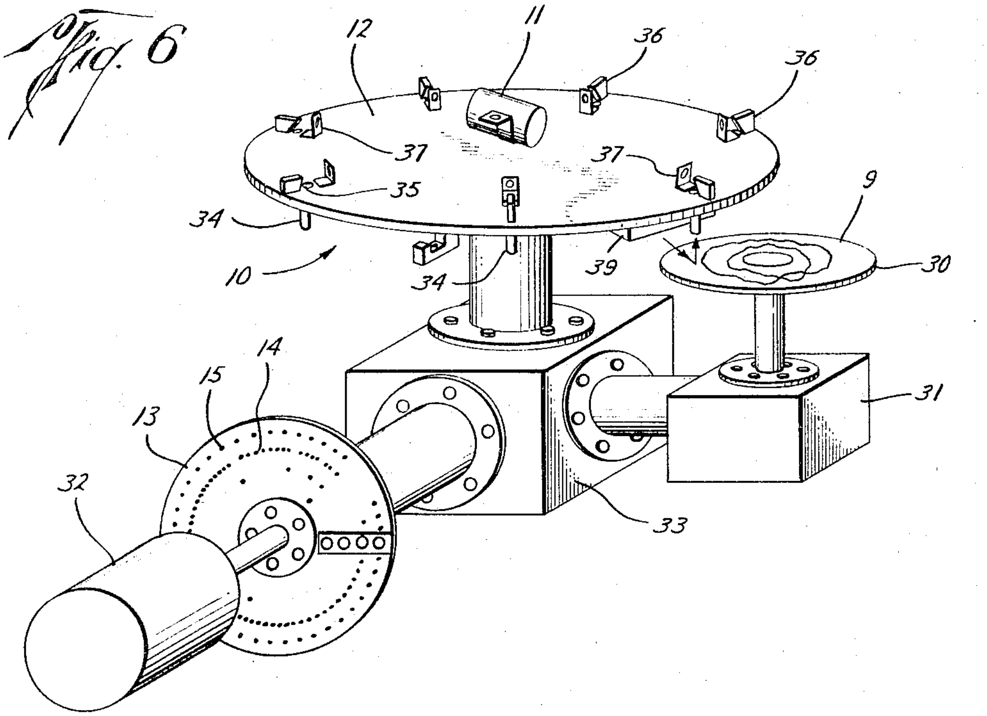
FIGURE 6 is a schematic view of the chart scanner mechanism and coded disc preferred for use with this invention with the light tight box removed.
Figure 7:
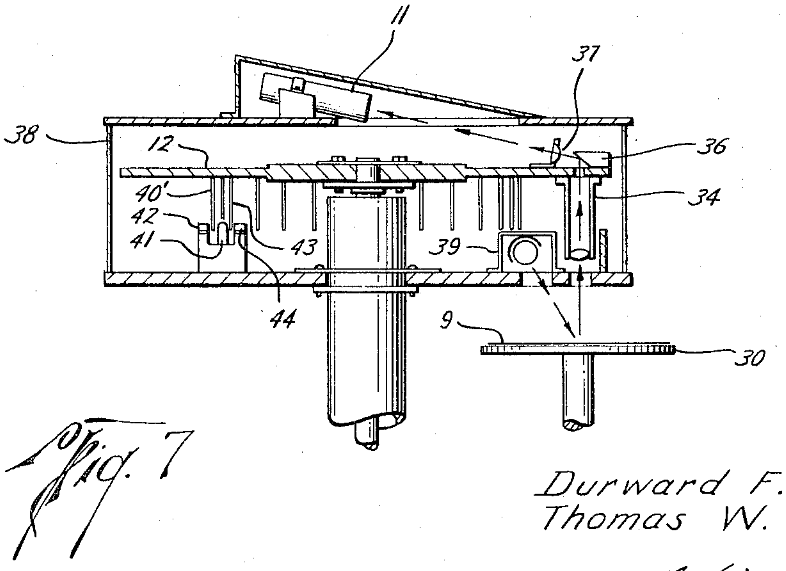
FIGURE 7 is a view in side elevation with parts broken away of the preferred form of electromagnetic radiation optical scanner system.
Figure 8:
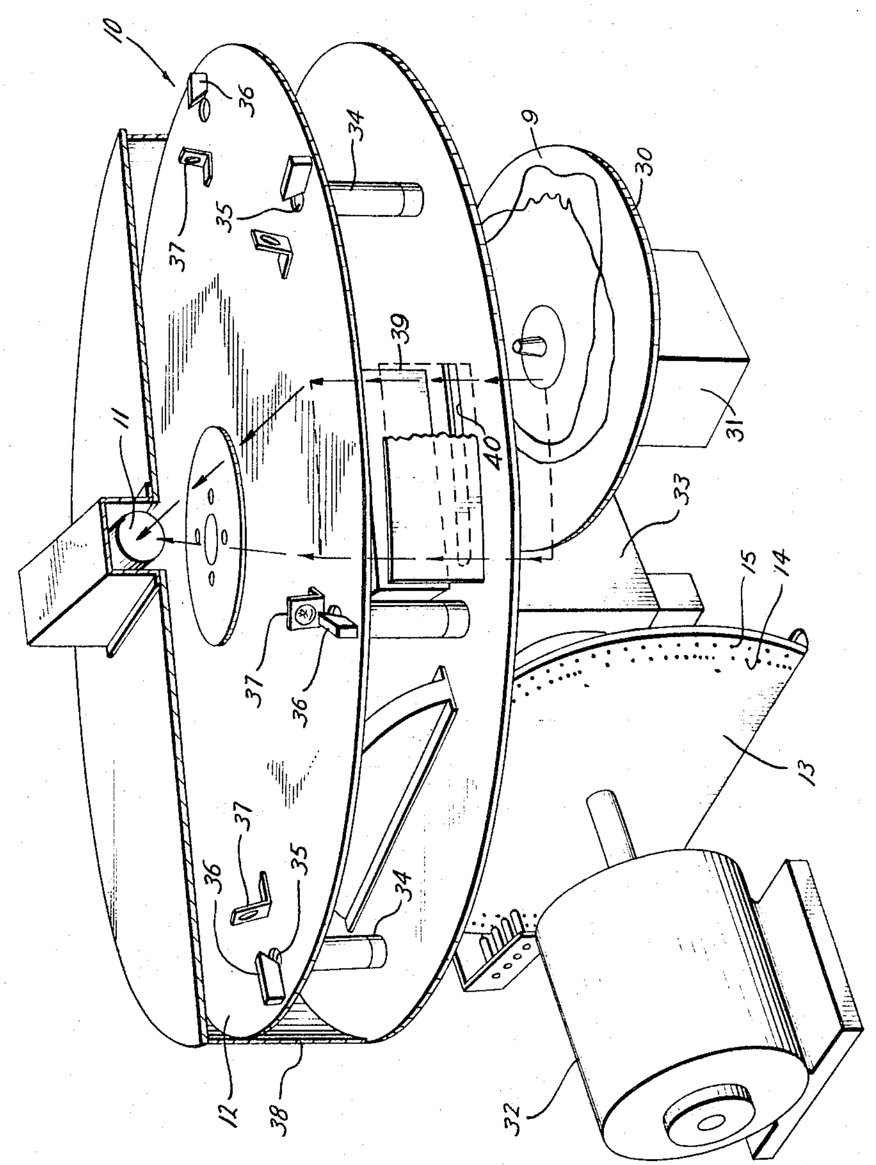
FIGURE 8 is a perspective view of the chart scanner mechanism and coded disc with the light tight cover shown in cross section to better illustrate the mechanism.

The coded disc 13 is provided with four different codes (see FIGURE 11). The outermost code 15 is a linearly spaced series of holes through which light from source 45 is passed to a photoelectric cell 46, such as a phototransistor.

Immediately inside of the linear code there is provided a logarithmic code. It will be noted that this code is a series of logarithmic codes to the base 2. Thus, the first series has one hole, the second series two holes, the third series four holes, the fourth series eight holes, and so on. Light passing through each of these holes from source 47 is picked up by a phototransistor 48.

Immediately inwardly from the logarithmic code there is provided a shift code 49 which is utilized to introduce a factor into the logarithmic code so that it is possible to utilize a series of logarithmic codes and utilize a small disc. One of the shift code holes is provided after each series in the logarithmic code, and pulses from light source 50 pass through these holes to the phototransistor 51. The manner in which pulses from this track introduce a factor into the logarithmic code will be explained hereinafter.

The fourth or innermost code has a single hole 52 which transmits light from source 53 to a phototransistor 54. As will be explained hereinafter, the single pulse generated before each cycle of the scan disc is utilized in conjunction with the shift track 49 so that on the compute cycle the same logarithmic pulses will be introduced into the counter as were introduced during the scan cycle.

Figure 5:
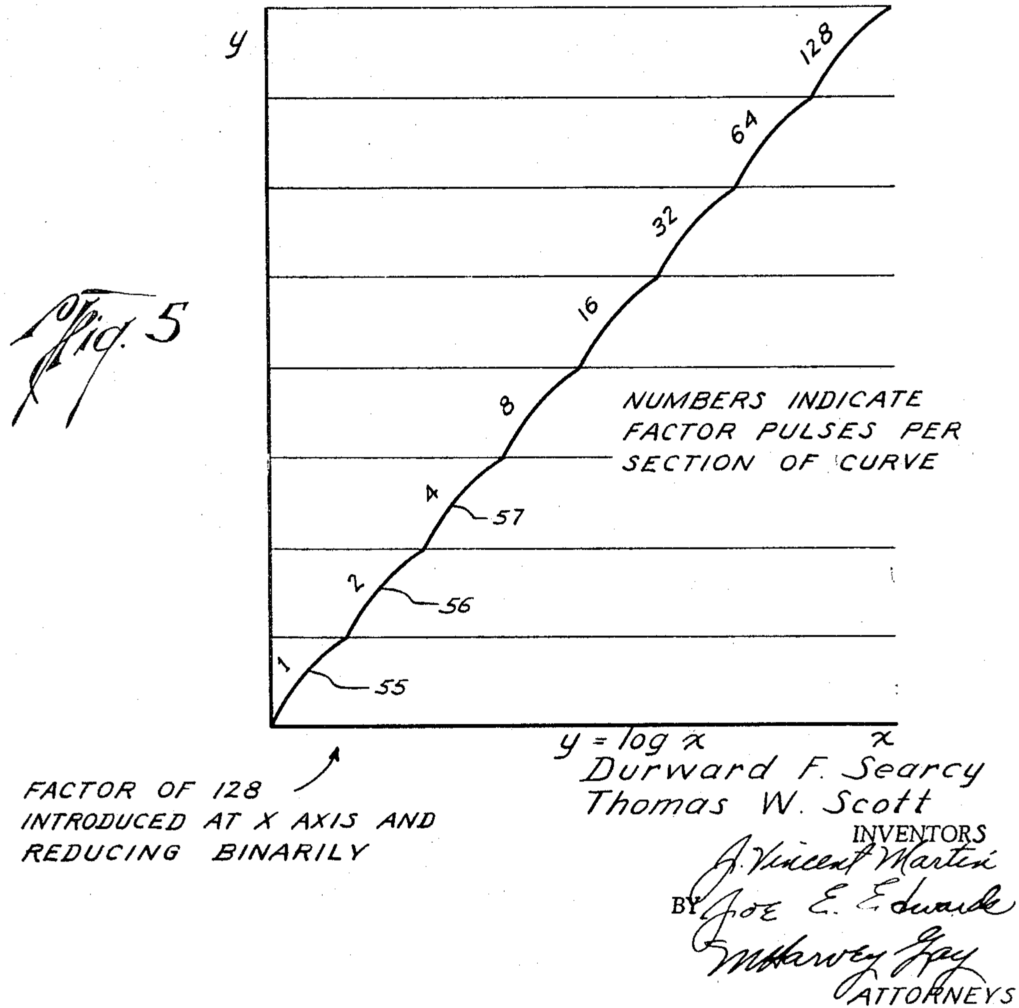
FIGURE 5 is a chart plotting a logarithmic curve in which a binary factor has been introduced to straighten out the log curve in the manner contemplated by this invention.

In considering the relationship of the logarithmic code 14 and the shift code 49, reference is made to FIGURE 5 wherein it is shown that the logarithmic curve is straightened out by introducing a binary factor into the system. Thus as shown in FIGURE 5, the single pulse at the beginning of the scan cycle is represented by the first curved segment 55. In like manner the next cycle of the logarithmic curve which contains two pulses is shown by the curve section 56. The third section of the logarithmic code contains four pulses, and this is represented by curve 57. The number of pulses increases by progressions until the eighth section of the curve has a total of 128 pulses. In introducing the first pulse from the logarithmic scale into the counter, the factor introduced from the shift track weighs it in the counter and gives it a value of 128. In like manner, the next two pulses introduced are given a value of 64 each. In the third series of logarithmic pulses, each is given a weighted value of 32, and so on.

Figure 9:
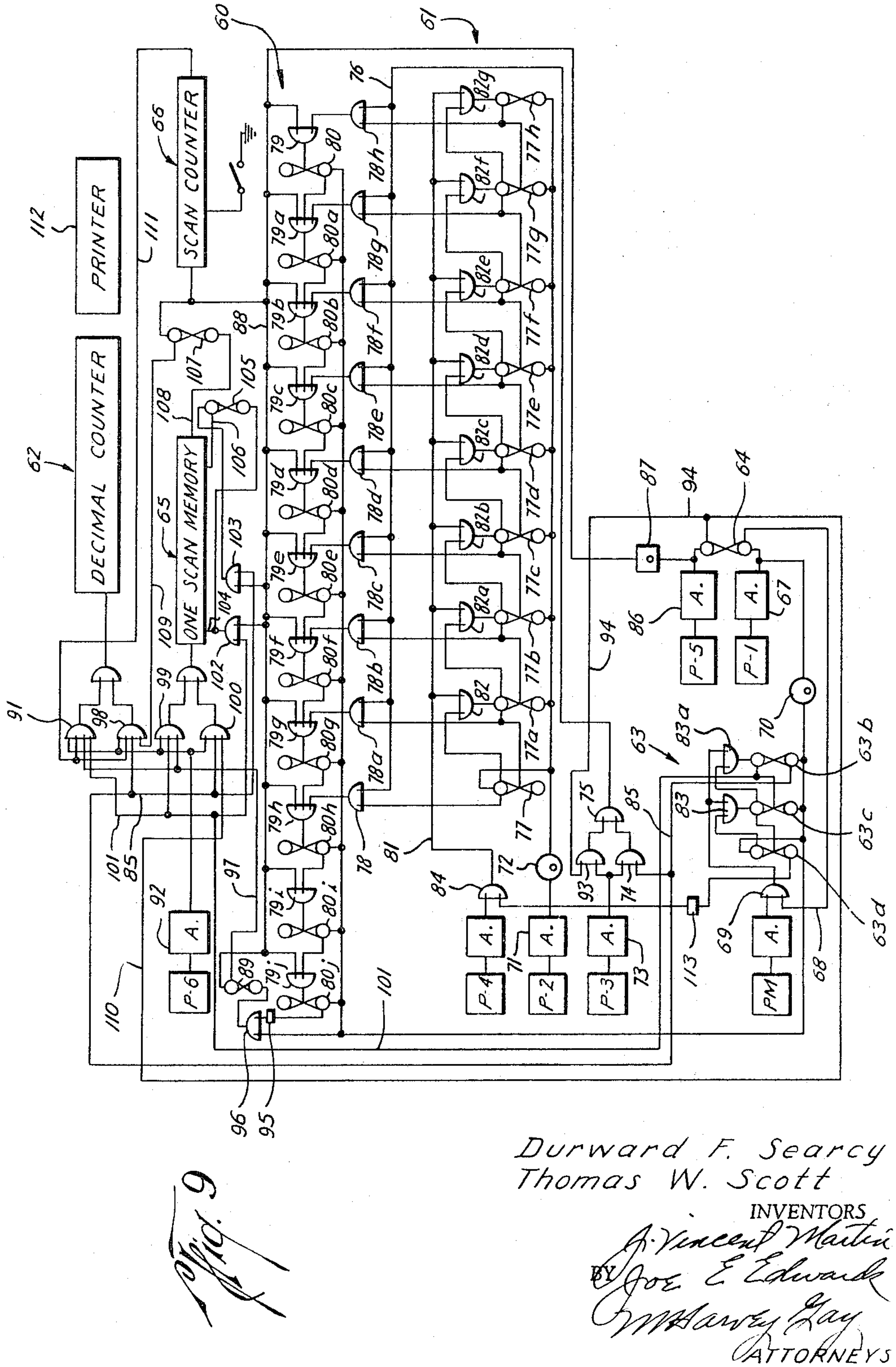
FIGURE 9 is a schematic diagram of the computer preferred for use with this invention.

The computer for extracting the square root of the product of the two values being measured is shown diagrammatically in FIGURE 9. Referring to FIGURE 9, the binary counter is indicated generally at 60. This counter is controlled by a shift unit indicated generally at 61, which, as heretofore explained, introduces a factor into the computer to permit use of a series of logarithmic signals and straighten out the logarithmic curve being measured.

After the signal has been stored in the binary counter and the compute cycle begun, a linear signal is fed into the accumulator, such as the decimal counter indicated generally at 62.

Control of the computer is provided by the ring-switcher, indicated generally at 63, and by a flip-flop 64, which respectively signal the beginning of a scan cycle and the beginning of a compute cycle.

In the event that a good scan is not made, a one-scan memory unit, indicated generally at 65, will feed the antilog of the last good scan logarithm into the decimal counter 62 as a substitute for the antilog of the bad scan logarithm.

A scan counter, indicated generally at 66, is provided to block any further signals to the decimal counter 62 after a pre-determined number of scans have been made.

The operation of the computer will be explained starting at the beginning of a scan cycle. As the scan disc 12 moves a lens 34 into position to begin a scan, a pin 40′ (FIGURE 7) activates the photoelectric cell 42 which sends a pulse $P_1$ through amplifier 67 and flips flip-flop 64 to the down, or re-set, position. The flip-flop 64 impresses a signal on conductor 68 which is transmitted as one input to an AND gate 69. This and other AND gates as shown hereon are valves which permit the flow of current only when all incoming lines to the gate are at a negative potential.

A signal is also fed from amplifier 67 through the reset generator 70 to the ring-switcher 63 and to the binary counter 60 which resets all of the flip-flops in these two units except one of the flip-flops of the ring-switcher which is placed in a set position.

Approximately simultaneously with the generation of the pulse at $P_1$, a signal $P_2$ is generated through the single hole 52 on the coded disc and is fed into the amplifier 71. The signal from amplifier 71 energizes the reset generator 72, which resets all of the flip-flops in the shift unit 61. For purposes which will appear later, one flip-flop 77 of the shift unit is placed in the set position by the reset pulse.

The computer is now in condition to begin the scan cycle and substantially simultaneously with the signals $P_1$ and $P_2$, the coded disc begins to generate a logarithmic signal $P_3$. This logarithmic signal is fed into amplifier 73 and from the amplifier through suitable gate controls to the binary counter 60. A flip-flop **63*b* of the ring-switcher, when placed in the reset position, generates a signal which places gate 74 in a condition in which pulses from the log track will be passed through it. These pulses pass through an OR gate 75 to the input line 76 of the binary counter. It will be recalled that the reset track pulse $P_2$ set all of the flip-flops of the shift unit in the reset position with the exception of one flip-flop 77, which was placed in the set position. By so doing, the several gates 78*a* through 78*h* were placed in the OFF position and the gate 78 was placed in the ON position, because only the flip-flop 77 was impressing negative voltage on one of the gates 78 through 78*h*. Therefore, the first pulse from the log track will pass through OR gate 79*h* and flip flip-flop 80*h*** from the reset to set position.

It will be recalled that there are eight shift track signal openings 49 on the coded disc, and that the generation of shift signals $P_4$ introduces a pre-determined factor into the binary computer. If we ignore the flip-flop 80, the purpose of which will hereinafter appear, it will be seen that the signal pulse introduced into the binary computer through gate 78 has a weighted value of 128.

At this time, the first pulse $P_4$ is received from the shift track 49 on the coded disc. This pulse travels along the input line 81 of the shift track and is gated through gate 82 to flip-flop **77*a*. The pulse is permitted to pass through gate 82 because the flip-flop 77 when placed in set position generated a delayed output to gate 82 which placed it in ON position. The first shift track pulse shifts flip-flop 77*a* from the reset to set position. In set position flip-flop 77*a* generates a signal which opens AND gate 78*a*. This signal also flips flip-flop 77 to reset position which closes gates 78 and 82. A delayed signal is also generated by flip-flop 77*a* which places gate 82*a*** in a position to receive a signal from the shift track. Thereafter, two signals are generated by the log track which pass through gate 78*a* and flip flip-flop 80*g* of the binary counter to the set and then reset position. Of course when the flip-flop 80*g* flips back to the reset position, a signal is generated which flips flip-flop 80*h* from the set to reset position. This latter flip-flop in turn flips the flip-flop 80*i* to the set position. In this manner, the signals from the log track are introduced into the binary counter with each series of signals being introduced into successively lower order digit flip-flops of the binary counter. The flip-flops 80*h*, *i*, and *j* of the binary counter will represent the characteristic of the logarithm, and flip-flops 80 through 80*g* will represent the mantissa of the logarithm.

Pulses from the coded disc continue to operate the binary counter until the first pulse is received from the photo-multiplier PM indicating passage of trace P. This pulse passes through the AND gate 69 and gate AND 83 which controls flip-flop 63*c*. Since pulse $P_1$, which occurred immediately before the scan cycle began, triggered the pulse generator 70 and set flip-flop 63*d* and reset flip-flops 63*b* and 63*c*, gate 83 was in a condition to receive the first pulse generated by the photo-multiplier, which will flip the flip-flop 63*c*. Flipping of flip-flop 63*c* flips flip-flop 63*d* to reset position which sends a signal to a differentiation network 113. This differentiation network introduces a pulse through the OR gate 84 to the shift register input line 81 and shifts the flip-flop next in line to be shifted in the shift register. Inasmuch as the counter 60 is a binary counter, it allows only half of the impulses thereafter received from the log track to be effectively introduced into the binary counter, so that this shift in effect divides by two or halves all further log impulses to the binary counter. This divide-by-two feature necessitates the addition of flip-flop 80 in the binary counter to cover the situation in which the signal generated by the log track would use substantially the full capacity of the binary counter.

When the flip-flop 63*d* was switched to the reset position, the control signal to gate 83 was turned off and this gate closed. However, in shifting the flip-flop 63*c* from the reset to set position, a delayed action signal was applied to gate 83*a* to prepare it for passing the next incoming signal from the photomultiplier.

The second signal is received from the photomultiplier indicating scanning of the trace D, this signal passes through the gate 83*a* and flips the flip-flop 63*b* to set position. In flipping flip-flop 63*b* from reset to set position, the signal is removed from line 85, which removes the signal from gate 74 and closes this gate. This prevents further signal $P_3$ from the log track passing into the input line 76 of the binary counter and stores in the binary computer the one-half of the sum of the logs of the two trace values. This count then is not disturbed until an "end scan" pulse $P_5$ complements the entire log counter (flip-flops 80–80*j*).

As soon as the coded disc makes one complete revolution, a second signal $P_2$ is generated by a light passing through hole 52, which resets the shift unit in the same manner as before. Approximately simultaneous with this signal, a pin 43 causes the photoelectric cell 44 to generate a signal $P_5$ which is fed into amplifier 86. This signal flips flip-flop 64 to its set position. This signal energizes the pulse generator 87 and a complementing pulse is fed to the binary counter through line 88 to complement the binary counter 60. The complementing pulse is also fed to flip-flop 89 which is placed in set position. When the flip-flop 89 is thus flipped, to set position, it places AND gate 91 in a condition to permit passage of signals to the decimal counter 62 when the other three connections are at the correct voltage. It will be noted that there are a number of other input signals to gate 91 the purposes of which will be explained later. At this time we are assuming that all of the other control signals to gate 91 are maintained at a negative voltage.

All during the running of the coded disc, the linear track has been generating a signal $P_6$. This signal is fed through amplifier 92 to the gate 91. As the gate 91 has previously been closed due to the lack of a signal from flip-flop 89, this linear signal has not been introduced into the decimal counter. However, with opening of the gate 91, the signal generated by the linear track will now be fed into the decimal counter.

When flip-flop 64, which was activated by the signal $P_5$, was placed in set position, a negative voltage was imposed upon the gate 93 through line 94. It will be recalled that gate 74 has been closed at this time. By opening gate 93, the signals from the log track during the compute cycle will be fed through gate 93, and from there through OR gate 75 to the input line 76 of the binary counter. Also, the shift counter will be operated in the same manner as previously explained, so that during the compute cycle a second logarithmic signal will be fed into the binary counter 60 in the same manner as previously explained. (It will be recalled that a signal $P_2$ was generated at the end of the scan cycle to reset the shift unit.)

Since the binary counter has been complemented, when the same number of logarithmic pulses have been sent into the binary counter as were stored in it before it was complemented, a maximum count will have been stored in the binary counter. One additional pulse from the log track will return the binary counter to its zero position. The above statement assumes that in counting impulses from the log track during the scan cycle, all of the flip-flops of the binary counter were used. The same practical effect occurs when all flip-flops are not used. After counting the second series of log track signals into the binary counter until the first scan and second compute counts become equal, all of the flip-flops beginning at the last point of input and to the left thereof would be in the set position. Then one additional pulse introduced at this point will flip all of the flip-flops to the left thereof to the reset position. Thus in effect, beginning at the point of input and proceeding to the left therefrom, the counter will be first placed in its set or zero position and then one more pulse will flip all of the flip-flops to the reset position. Of course, if at the time of completing the recounting of the original stored logarithmic count in the binary counter, a shift track pulse is received, it may require one or two pulses from the next lower order digit to flip all of the flip-flops to the left thereof from set to reset position.

When binary counter flip-flop 80*j* is flipped from set to reset position, a pulse is generated which passes through the differentiation network 95 and OR gate 96 to shift the control flip-flop 89 to reset position. Flipping of this flip-flop 89 to reset position removes the negative voltage from line 97 and closes gate 91 which controls the incoming linear count to the decimal counter. Thus, there has been stored in the decimal counter a count which is equal to the antilog of the count that was stored in the binary counter during the scan cycle.

While one or two additional pulses from a log track are necessary to operate the control flip-flop 89, these additional pulses percentagewise are so small that the two signals from the log track; that is, from the scan cycle and the compute cycle which are introduced into the binary counter, may be said for all practical purposes to be equal.

At this time the signal $P_1$ is again generated by a pin 40′ passing photocell 42 and the computer is reset and ready for another cycle.

The explanation of the computer up to this point has assumed that every scan made by the scanning mechanism was a good scan, that is two and only two traces were picked up from the chart. However, this condition will not always exist as the two traces may cross or a smudge or speck of dirt, etc. might cause only one or more than two signals to be generated by the photomultiplier.

When a good scan is made, the linear track is permitted to feed through what might be termed good scan gate 91. When a good scan is not made, it is desired to prevent the computations made by the computer from reaching the decimal counter as they would be erroneous, and to substitute therefor as close an approximation as possible to the last good scan. For this purpose, a one scan memory or storage 65 is provided which remembers or stores the antilogarithm of the last good scan logarithm and this last good scan antilogarithm is substituted for the decimal value of the bad scan. It might be noted that if the one scan memory were not used, an approximation could be made by preventing entry of a decimal value for the bad scan into the counter 62 and simultaneously preventing operation of the scan counter during a bad scan and permitting the scan counter to make the desired total number of good scans by repeating a portion of the first scans made when the chart was first placed on the table. For best results with this latter procedure, scanning of the chart should begin at its most average position.

The one scan memory is a binary computer of straight counter form in which flip-flops, such as shown in the binary counter 60, may be used. The gates **79–79*j* of counter 60** are omitted, and the count is fed directly into the trigger input of the lowest order flip-flop.

To control the one scan memory and substitute its content for a bad scan value, signals are fed through three gates 98, 99 and 100, which are coordinated with the gate 91. The gate 98 is the remembered scan gate which permits introduction of a remembered or stored previous scan antilog into the decimal counter 62 during a bad scan. Gate 99 is the new scan gate which provides for putting a new good scan on the one scan memory. Gate 100 is the bad scan gate which operates the one scan memory when a bad scan occurs. It will be recalled that upon receiving a signal from the second pressure trace from the chart, the ring switcher flip-flop **63*b* is flipped to set position. When this is done a negative voltage is supplied through line 101 to the good scan gate 91 and to the new scan gate 99. A negative voltage is also imposed through the line 101 on AND gate 102. If only a single trace is noted or if more than two traces are noted, the flip-flop 63*b* of the ring switcher will stay or be returned to reset position. Under these conditions, the negative voltage will not be imposed on line 101 during the compute cycle but will instead be on line 85, which may be termed the bad scan input line, as it supplies a negative voltage to the remembered scan gate 98 and to the bad scan gate 100. A negative voltage is also applied through line 85 to gate 103** which controls the one scan memory.

Assuming that two and only two signals are received from the photomultiplier, the line 101 will impose a negative voltage on gate 102 during the latter portion of the scan cycle. Then at the end of the scan cycle the complementing pulse is fed from line 88 to the gate 102, as well as to the several flip-flops of the binary counter. This complementing pulse passes through gate 102 to line 104 and resets the one scan memory unit to zero. The complementing pulse also resets flip-flop 105. Flip-flop 105 is the complement switch for the one scan memory.

Thus, a good scan has just been made and the compute cycle with the one scan memory unit reading zero is about to begin. As the linear track pulses are fed into the decimal counter 62 through the good scan gate 91, pulses will also be fed from the linear track through the new scan gate 99 to the one scan memory unit 65. When the control flip-flop 89 which receives the impulse from the binary counter flips to reset position, it removes the negative voltage from one of the inputs to the good scan gate 91 and also to the new scan gate 99, thus storing in both the decimal counter and one scan memory the linear number which is the antilog of the original value stored in the binary counter.

If continued good scans are received, the one-scan memory will be reset each time and a new number stored therein. In the event a bad scan is encountered and the ring switcher flip-flop **63*b* remains or is returned to its reset position, the bad scan circuit 85 will have a negative voltage thereon and this voltage will be applied to the complement gate 103. Then at the end of the bad scan cycle, the binary counter will be complemented and this complement pulse will pass through gate 103. As the good scan circuit is not energized, the gate 102 will block the complementing pulse from resetting the one-scan memory. The signal passing through gate 103 sets the complement flip-flop 105 which imposes a complement pulse on the one-scan memory through line 106 to complement the one-scan memory. This signal from line 88 also places a flip-flop 107 in set position, which in turn generates a signal which opens gate 98. During the compute cycle following a bad scan, the gates 98 and 100** being opened, the linear signal is fed through these gates to the one-scan memory and to the decimal counter.

When the one-scan memory has been driven to its maximum capacity plus one additional pulse, it will impress a signal on line 108 which flips the flip-flop 107 to its reset position. This will remove the negative voltage from line 109 which was generated by the flip-flop 107, and, as this removes one of the voltage inputs to the remembered scan gate 98, this gate is now closed. Therefore, the number stored in the one-scan memory has been introduced into the decimal counter as a substitute for the bad scan value.

At this time, we have used a portion of the linear track which is equal to the number previously stored in the one-scan memory, and the one-scan memory has been returned to zero. By making the capacity of the one-scan memory equal to the total number of linear pulses which can be generated by the linear track, the one-scan memory can be made to store therein the complement of the number computed by the binary computer at the end of the compute cycle. This can be done by continuing to count into the memory the full number of pulses of the linear track, even though count to the accumulator was stopped when the memory passed through its full or zero state. This should be done in order to prepare the memory for a possible re-use in case of another bad scan. With this arrangement, after the last pulse from the linear track has been counted into the memory, the memory will be in the same condition as it was after having been complemented and will contain a number equal to the capacity of the memory, and, therefore, of the linear track, less the linear number representative of the last good scan. This is the complement of the value of the last good scan.

If more than one bad scan be successively made, it is necessary again to introduce into the decimal counter the last remembered or stored good scan value, and since the one-scan memory contains the complement of this number, it is in condition for a repetition of the count of the stored value into the linear counter and the accumulator.

It will be noted that the complement flip-flop 105 is already set in the set position and will not return to the reset position until a good scan is received and a signal transmitted through the gate 102. Therefore, if this complement of the remembered number can be retained in the one-scan memory through the scan cycle, it will be available for operation in the manner previously explained. For this purpose, the bad-scan gate 100 is provided with a negative voltage input through line 110. The line 110 is fed from the set side of flip-flop 64, which is in the reset position during the scan cycle. Therefore the gate 100 will be closed during each scan cycle. At the end of a scan cycle, the flip-flop 64 is in its set position, line 110 carries a negative voltage, and the gate 100 is open. As a result, the complement of the remembered number remains on the one-scan memory, and after a bad scan, the linear track will feed through gate 100 during the next compute cycle. If the next scan cycle is bad, flip-flop **63*b* will not be in set position when the complementing pulse is generated, and, therefore, gate 102 remains closed and the memory is not returned to zero. The complementing pulse will, however, flip flip-flop 107 to set position and again open gate 98. Then during the compute cycle the linear track will again feed into the one-scan memory, and, when the memory unit returns to zero, flip-flop 107** will be flipped to reset position. As the linear track has meanwhile been feeding into the decimal counter, the last remembered good scan is again placed in the decimal counter. At the end of the compute cycle, the one scan memory will again have stored therein the complement of the last good scan and the cycle explained above will be continued until a good scan is received.

The mensuration of decimal values during the compute cycle of the values, scanned, as determined by the pulses generated by the linear track 15 and its associated electromagnetic radiation sensing apparatus, provides a simple clock pulse generator measurement of the functions of the traces on the chart. Any other suitable clock pulse generator, similarly controlled by noting the start of a scan and the sensing of a trace or by other limits determinative of the measurement, as represented by the logarithmic count in the log counter for a good scan or by the remembered number in the memory for substitution for a bad scan, could be used for determining the value of the trace function measured by the scanner and for generating and entering a decimal count into the accumulator corresponding to such value.

The output from the scan counter 66 supplies a negative voltage to good-scan gate 91 and remembered scan gate 98 through line 111. As soon as the scan counter has counted a predetermined number of scans, this voltage is removed from line 111, which closes both the good-scan gate 91 and the remembered-scan gate 98, and the count standing in the decimal counter will represent the total flow through the line during the period represented on the chart. In operating the computer, the scan counter should be pre-set to provide a number of revolutions equal in value to the hours on the chart and, therefore, a chart which is not completely used may be read by this device by relating the number of counts permitted by the scan counter to the hours during which the chart was used.

The count in the decimal counter may be read directly or it may be automatically printed on printer 112 by a signal from the scan counter, if desired.

While the scanners have been illustrated as utilizing electromagnetic radiation sensing units, and more specifically light sources and photosensitive members, these can comprise other suitable electromagnetic scanning devices, such as well-known types of electromagnetic scanners as that disclosed in Patent 1,555,281, Engl et al., Patent 2,882,475, De Neergaard, or Patent 3,025,444, Myska, wherein the records may be on magnetizable media, as well as on light sensitive media, or of the type disclosed in Patent 2,628,572, Le Goff, wherein the code is formed in a rotatable wheel or disc and comprises magnetic members arranged in a predetermined order which is sensed by the sensing member similar to the optical sensing of a coded disc in the Myska Patent 3,025,444. These variations are not illustrated in detail in the apparatus shown in the drawings, as specific details thereof are not part of this invention and the illustrated embodiment serves to disclose the novel and useful aspects of the features involved and the inventive details thereof.

As has been explained, the preferred binary computer for carrying out the present invention is illustrated schematically in FIGURE 9 and utilizes a digital computer throughout. In some instances, it might be found desirable to substitute certain analog components in the system. This can readily be accomplished by a system such as that illustrated in FIGURE 9A.

This analog computer is adapted to utilize analog components which will provide the same functional computations as the digital computer shown in FIGURE 9 and, in general, may be considered as an analog logarithmic computer.

GENERAL DESCRIPTION

As has been explained with reference to the digital computer shown in FIGURE 9, the present computer is constructed and arranged to provide the integral of the square root of the product of two variables which are represented by traces on a chart. The square root of the product of the two variables is obtained by a logarithmic method of computation. The system illustrated in FIGURE 9A provides a computer which utilizes an analog logarithmic method of obtaining the integral of the square root of the product of the two variables represented by the trace levels on a chart such as that obtained on a conventional orifice meter chart described with reference to the system of FIGURE 9.

Figures 9A, 9B:
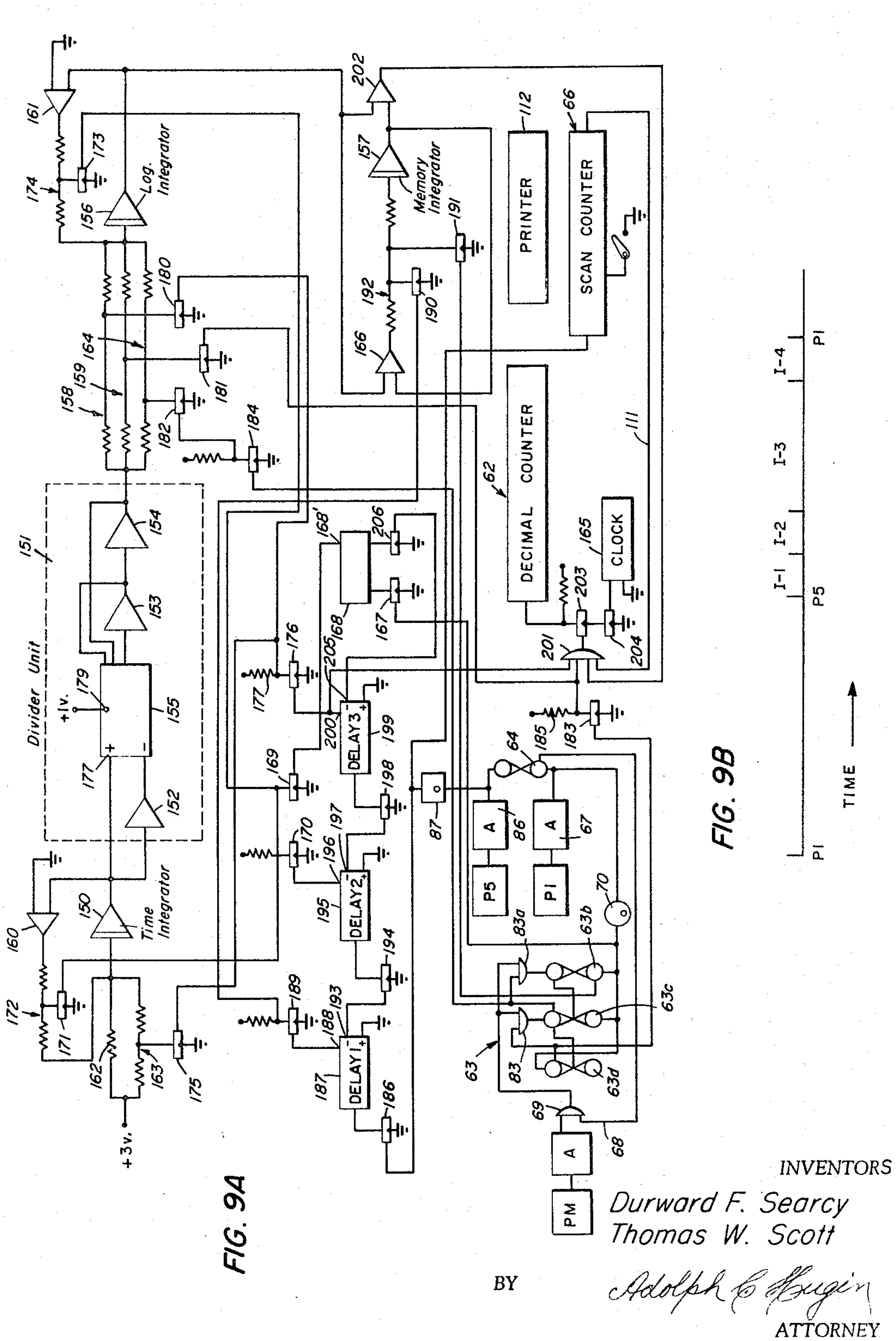
FIGURE 9A is a schematic diagram of another embodiment of the computer from that shown in FIGURE 9 wherein the intermediate computations are performed by analog components rather than the mechanical and digital components of the system shown in FIGURE 9.
FIGURE 9B is a graph illustrating the operating time intervals for each complete operating cycle of the scanning and computing functions of the computer illustrated in FIGURE 9A.

The scanner which is used with a system such as that shown in FIGURE 9A may be the same as that for the system of FIGURE 9, and the system will utilize the same input components as those of FIGURE 9. Two of these input components are represented by the input pulse generators P1 and P5 which respectively generate the start scan pulse and the end scan pulse. These two pulses are adapted to be amplified in any suitable manner, as in the FIGURE 9 system, by pulse amplifiers 67 and 86. These amplified pulses form the input respectively to pulse generators 70 and 87 and also control the operation of the flip-flop 64 in the same manner as has been explained with reference to FIGURE 9. In addition, the ring-switcher 63 which includes the flip-flops **63*b*, 63*c*, 63*d*, and AND gates 69, 83, and 83*a* of the FIGURE 9 system are utilized. The flip-flops 63*b*, 63*c*, and 63*d* are the trace counter flip-flops and are operable in the same manner as in FIGURE 9. In addition, the final output components of the computer may comprise the same units as those of the system shown in FIGURE 9, comprising the decimal counter 62, the scan counter 66, and the printer 112**. These will be utilized in the same manner as in the embodiment shown in FIGURE 9.

In order to facilitate an understanding of this embodiment of the invention, the following description will provide a general explanation of the system and its operation and a detailed description of the system will then be given. In addition, the description of the operation of this system will proceed from the occurrence of a start scan pulse P1 and follow the operation through a scan and compute cycle.

The analog circuit of the computer comprises a time integrator 150, such as that described in "Electronic Analog Computers," Korn and Korn, McGraw-Hill Book Company, 2nd edition, 1956, pp. 18–20 and 166–184, also described in "Transistor Circuit Engineering," Shea, John Wiley & Sons, 1959, pp. 149–153, a divider unit 151 comprising analog amplifiers 152, 153, and 154 for driving and inversion purposes, and a quartersquare multiplier 155 connected to perform division. The analog amplifiers may be of any suitable type, such as those described in the two texts previously cited as disclosing suitable time integrators. Such analog amplifiers are described on the same pages as the time integrators in these texts. The quartersquare multiplier may suitably be of the type disclosed in "Analog Computer Techniques," Johnson, McGraw-Hill Book Company, 1956, pp. 142–143 or "Introduction to Electronic Analogue Computers," Wass, McGraw-Hill Book Company, 1955, p. 142. This divider unit is used to produce the reciprocal of the output from the time integrator 150. The analog circuit also comprises a second analog integrator 156, which is the log integrator that integrates the reciprocal function with respect to time and thus yields at its output the logarithm of the time integrator output. The analog circuit further includes a memory integrator 157 to which the output of the log integrator 156 is transferred if a good scan, as previously explained with reference to the digital system, occurs. Various control and gating circuits are employed to achieve the desired results and these will be explained in the detailed system description.

In general, with the occurrence of a start scan pulse P1, the time integrator 150 begins integrating a fixed voltage which is impressed on its input and thus generates a linearly increasing voltage signal with respect to time. This linearly increasing voltage signal is fed to the divider unit 151 which yields at its output the reciprocal of its input value. This reciprocal voltage value, representing the reciprocal of the time integrated, is connected through an input resistor string 158 to the log integrator 156. This connecting resistor string is varied during different operations of the system, as will subsequently be explained. This input to the log integrator 156 is operable in this manner until the scanning device detects the first trace on a chart during each scan. Thus, during this period, the log integrator 156 produces at its output a voltage directly proportional to the logarithm of the output of the time integrator 150. With the sensing of the occurrence of the first trace on a chart during each scan, the input to the log integrator 156 through the resistor string previously mentioned is interrupted by the action of the trace counter 63*d*. At this instant the output of the log integrator 156 is a voltage directly proportional to the logarithm of the value represented by the first trace sensed by the scanning device.

At the time that the first input to the log integrator 156 is stopped, a second input resistor string 159 is activated or connected between the output of the divider unit and the input of the log integrator. This second resistor string contains twice as much resistance as the first mentioned resistor string 158. The connection which introduces this second resistor string into the circuit is controlled by the trace counter 63*c*. As a result of this change in the input resistance, the log integrator 156 now integrates the reciprocal voltage value from the divider unit 151 at half the previous rate from the time of the occurrence of the first trace sensed by the scanning device. When a second trace is sensed by the scanning device, the input to the log integrator through the second resistor string 159 is interrupted and the log integrator 156 holds at its output a voltage which is equal to $$e_3=\frac{k_2k_3}{k_1}(\log_e T_1+\tfrac{1}{2}\log_e T_2-\tfrac{1}{2}\log_e T_1)=K\tfrac{1}{2}(\log_e T_1+\log_e T_2)$$

In this equation the constant $k_1$, $k_2$, and $k_3$ represent the characteristics of the time integrator 150, the divider unit 151, and the log integrator 156, respectively. The constant ½ results from the fact that, in the second part of the integrating function, the integration which was performed between the time $T_1$ when the first trace was sensed and the time $T_2$ when the second trace was sensed was carried on at one half the rate of the integration from the beginning of the scan cycle to the time $T_1$ of the sensing of the first trace. Thus, the voltage at the output of the log integrator 156 is directly proportional to one half the sum of the logarithms of the values represented by the respective traces or, in other words, is directly proportional to the logarithm of the square root of the product of the values represented by these two traces.

The compute cycle of this analog system begins with the occurrence of an end scan pulse $P_5$. The origin of this pulse has been explained with reference to the digital computer system of FIGURE 9. At this time, the voltage value at the output of the log integrator is transferred to the memory integrator 157. In FIGURE 9B the scan cycle is represented by the time between the points $P_1$ and $P_5$, and the time interval for the transfer of the voltage value from the log integrator to the memory integrator is represented by the interval I–1. After this transfer has been completed, the time integrator 150 and the log integrator 156 are cleared, that is, are restored to initial operating conditions, by clearing amplifiers 160 and 161, respectively. These clearing amplifiers may be of the type described in "Transistor Circuits for Analog & Digital Systems," Blecher, Bell System Technical Journal, vol. 35, (1956), pp. 320–327, and "Transistor Circuit Engineering," Shea, John Wiley & Sons, 1959, p. 151.

This amplifier clearing occurs during a time interval I–2, FIGURE 9B. At the beginning of a third time interval I–3, FIGURE 9B, the time integrator 150 again begins generating a linearly increasing voltage signal by integrating a fixed reference voltage. The rate of integration during this third time interval I–3 must be twice as fast as the original rate of integration by the time integrator 150 in order to obtain the desired completion of the computation during the compute cycle in substantially the same time as required for the performance of a complete scan cycle. This can be obtained by halving the input resistance to the time integrator. This change in the input resistance can be conveniently obtained by initially impressing the input voltage to the time integrator 150 during the scan cycle through a resistor 162 which is connected in parallel with a resistor string 163 having the same over-all resistance as resistor 162. During the scan cycle the resistor string 163 is rendered ineffective, so that only the resistance of the resistor 162 controls the input to the time integrator from the reference voltage which, as shown in FIGURE 9A, may conveniently be +3 volts. During the third time interval I–3 the resistances of the resistor 162 and the resistor string 163 are connected in parallel with the result that the input resistance from the reference voltage to the time integrator is one half the value of this input resistance during the scan cycle and the time integrator 150, therefore, integrates twice as fast. This speed-up is necessary since only half the time is available for the read-out during the compute cycle of the instrument as was available during the scan cycle. The reason for this is that the total of the scan cycle is substantially equal to the total time interval for the compute cycle and three other functions requiring time intervals must be performed during the compute cycle in addition to the read-out. The voltage output of the time integrator 150 during the read-out interval I–3 is again connected to the divider unit 151 as its input, and this unit produces at its output the reciprocal of its input value, as previously described. This reciprocal value output voltage of the divider unit 151 is connected to the log integrator 156 through a third input resistor string 164 which is connected so as to complete a circuit therethrough from the divider unit output to the log integrator input during the read-out interval I–3. During this interval, the other two resistor strings 158 and 159 between the divider unit and the log integrator are rendered inoperative, so that the only input resistance to the log integrator is that of the resistor string 164. During this time, the log integrator 156 produces at its output a voltage that is directly proportional to the logarithm of the output of the time integrator 150.

At the beginning of the time interval I–3, a suitable clock 165, such as that described in "Digital Modules," Digital Equipment Corporation, 1962, p. 209, preferably of the crystal type, is connected to the decimal counter 62 to provide linear clock pulses to the input of this counter. The output of the log integrator 156 is connected to one input of a comparing amplifier 166 which may be of the type described in "Transistor Circuits for Analog & Digital Systems" (supra), pp. 320–327, and "Transistor Circuit Engineering" (supra), p. 151. The other input of this comparing amplifier 166 is connected to the output of the memory integrator 157, which holds at its output a voltage value directly proportional to the logarithm of the square root of the product of the trace levels on the chart being processed. The comparing amplifier 166 compares the output of the log integrator with the output of the memory integrator during this readout portion of the compute cycle and, when the two values are equal, its output reverses or switches and, as a result of suitable gating, stops any further linear clock pulses of the clock 165 from reaching the decimal counter 62. As a result, a number of clock pulses have been counted by the decimal counter 62 during the interval I–3 of the compute cycle which is directly proportional to the antilogarithm of the value standing at the output of the memory integrator or, in other words, the count in the decimal counter 62 is directly proportional to the square root of the product of the two values represented by the two chart traces sensed by the scanning device during the scan cycle.

At the end of the time interval I–3, the time integrator 150 and the log integrator 156 again are cleared during a time interval I–4, FIGURE 9B, and the computer system is restored to initial operating conditions for the start of a new scan cycle. This general operation of the system shown in FIGURE 9A occurs for each scan of the chart, so that the total value accumulated in the decimal counter 62 is directly proportional to the integral of the square root of the product of the trace levels on the chart for the period during which the chart is scanned.

DETAILED DESCRIPTION

*Scan cycle.*—As has been explained, the operation of the analog system of FIGURE 9A comprises a scan cycle and a compute cycle and the scanning operation may be performed by a scanning device such as that described with reference to the digital system illustrated in FIGURE 9. With such a scanning device a start scan pulse $P_1$ is amplified by a suitable amplifier 67 and generates a suitable start scan pulse for operating the system by a pulse generator 70, which is connected to the base of a suitable transistor inverter 167 which may be of the type described in "Digital Modules" (supra), pp. 11–12, so as to close a circuit through this inverter and set a flip-flop 168 off. When this occurs the output terminal 168' of the flip-flop 168 is placed at ground potential. This terminal 168' is connected to the base of an inverter 169 so that the collector of this inverter, which is connected to a negative clamping load, tends to assume the negative clamping voltage. At this time, during the operation of the computer, the base of an inverter 170 also is at ground potential, as a negative potential is impressed on the base of this latter inverter only during the time interval I–2. Thus, the collector of the inverter 170, which is connected to the same clamping load as the collector of the inverter 169, also tends to assume the negative clamping voltage with the result that the collectors of both the inverters 169 and 170 are at the negative clamping voltage. The collectors of the inverters 169 and 170 are connected directly to the base of an inverter 171, and the collector of this latter inverter is connected to substantially the mid point of a clearing circuit input resistor string 172 for the time integrator 150. When a negative voltage is impressed on the base of the inverter 171, it grounds the mid point of the resistor string 172 and thereby effectively nullifies any effect of the clearing amplifier 160 on the time integrator, so that the clearing amplifier 160 no longer is able to hold the time integrator 150 in a cleared condition. The collectors of the inverters 169 and 170 also are connected to the base of an inverter 173 so as to turn this inverter on. The collector of the inverter 173 is connected to substantially the mid point of a clearing circuit input resistor string 174, so that it substantially grounds the mid point of this resistor string when the inverter 173 is turned on. This operates to render the clearing amplifier 161 inoperative, as its voltage is grounded through the inverter 173, and it is no longer able to hold back the log integrator 156 in a cleared condition.

This removal of the clearing circuits from the time integrator and the log integrator permits these two units to operate. The time integrator 150 thus begins integrating the input reference voltage which is connected to its input through the resistor 162. During this period, the resistor string 163 in parallel with the input resistor 162 is ineffective as its mid point is substantially grounded through an inverter 175 which is turned on during the scanning cycle by having its base connected to the collector of an inverter 176 which is connected to a suitable clamping load 177. The base of the inverter 176 is at substantially ground potential during this period of the scanning cycle so that its collector is maintained substantially at the negative voltage impressed on the clamping load 177, and this negative voltage is, therefore, impressed on the base of the transistor 175, thereby turning this inverter on and rendering the resistor string 163 ineffective in the input circuit of the time integrator.

The output voltage $e_1$ of the time integrator 150 is impressed upon a positive terminal 177 of the quarter-square multiplier 155 and also on the input of the inverter amplifier 152. The output of the inverting amplifier 152 is connected so as to be impressed upon a negative terminal 178 of the quarter-square multiplier 155. The positive and negative input values are necessary for the proper operation of the quarter-square multiplier to perform division. In addition, a one-volt reference voltage is connected to a reference terminal 179 of the multiplier. A driving amplifier is provided for the output of the multiplier 155 and comprises the amplifier 153, the output of which is connected to the input of the inverting amplifier 154 so as to provide an output voltage signal to the divider unit 151 having the desired polarity. The result of these interconnections in the divider unit 151 is that the output voltage signal of this unit is a voltage $e_2$ which is the reciprocal of the input voltage $e_1$ impressed upon this unit by the time integrator 150.

This reciprocal voltage $e_2$ is impressed by a suitable connection as the input voltage to input resistor circuits for the log integrator 156. These resistor circuits include the three resistor strings 158, 159, and 164 which are respectively controlled by inverters 180, 181, and 182.

The base of the inverter 180 is connected to the collector of the inverter 176 and is operated by the same voltage of this collector as the inverter 175, so that during the scan cycle, a negative voltage is impressed upon the base of the inverter 180 by the clamping voltage on the clamping load 177 of the inverter 176 such that the inverter 180 is turned on and thereby grounds the resistor string 158 and effectively removes any effect of this resistor string on the operation of the log integrator during the scan cycle. The inverters 181 and 182 are controlled by the flip-flops **63*d* and 63*c*, respectively. These flip-flops form part of the trace counter, as has been described with reference to the digital computer system illustrated in FIGURE 9 and are used for determining the number of traces that occur during a scan of a chart. When the scanning device begins a new scan and a start scan pulse $P_1$ occurs and is impressed on the flip-flop 63*d*, this latter unit is set on and a negative voltage level is impressed on the base of an inverter 183. This turns the inverter 183 on and causes a ground potential to appear at the collector of the inverter 183 which is connected to the base of the inverter 181 so that this latter inverter is turned off. In this condition, the collector of the inverter 181 is ungrounded, so that the resistor string 159 is connected between the output of the divider unit 151 and the input to the log integrator 156. Thus, the log integrator 156 is turned on and begins to integrate at start scan time, which corresponds to the occurrence of the start scan pulse $P_1$. The flip-flop 63*c* is not turned on until the scanning device detects the first scan, and this flip-flop is connected to the base of an inverter 184 such that during this period, when the flip-flop 63c is not turned on, ground potential is impressed on the base of the inverter 184, thereby turning this inverter off. This places the collector of the inverter 184 at clamped negative potential, and therefore impresses this negative potential on the base of the inverter 182 to which it is connected. This condition turns the inverter 182 on, thereby grounding the collector of the inverter 182. This collector is connected to substantially the mid-point of the resistor string 164 so that, under these conditions, this resistor string is grounded through the inverter 182** and is thereby removed or inactivated with reference to the input to the log integrator.

Under the foregoing conditions, after a scan has been begun, the log integrator 156 begins integrating the reciprocal voltage signal $e_2$ and thus yields a voltage signal at its output which is directly proportional to the logarithm of the output of the time integrator 150. This integration continues until the scanning device detects a first trace. On the detection of the first trace, the flip-flop 63d is turned off by a pulse from the photomultiplier PM, as has been explained with reference to the digital system illustrated in FIGURE 9. Thus, a ground potential is impressed on the base of the inverter 183, and this inverter is turned off so that its collector goes to a negative voltage to which it is clamped through a clamping load 185. As has been explained, the collector of the inverter 183 is connected to the base of the inverter 181, and, when its voltage becomes substantially the negative clamped voltage, the inverter 181 is thereby turned on so that its collector is grounded. This effectively grounds the resistor string 159 and prevents any further input through this resistor string to the log integrator 156. At this instant, the output of the log integrator 156 is a voltage which is directly proportional to the logarithm of the time integrator 150 at this time or, more specifically, is a voltage signal which is directly proportional to the logarithm of the value represented by the first trace on the scanned chart. At this same instant, that is, at the time of the sensing of the first trace, the flip-flop 63c is turned on and the negative level from this flip-flop is impressed by a connection to the base of the inverter 184, thereby turning this inverter on and grounding its collector which is connected to the base of the inverter 182. When the base of the inverter 182 is thus grounded, the collector of this latter inverter becomes ungrounded so that the resistor string 164 no longer is grounded through the inverter 182 and is effective in forming a connection between the output of the divider unit 151 and the input of the log integrator 156. This resistor string 164 has twice the resistance of the resistor string 159, so that the log integrator 156 will integrate half as fast through this resistor string as through the resistor string 159. Thus, the log integrator 156 continues to integrate its input voltage after the first trace has been sensed at half the rate of integration during the interval between the start scan pulse and the sensing of the first trace. This integration continues until the scanning device detects a second trace.

When a second trace is sensed, the flip-flop 63c is turned off, as has been explained with reference to the digital system of FIGURE 9, and, through the connections of this flip-flop which already have been described, thus prevents any further input to the log integrator 156 as it results in a grounding of the collector of the inverter 182. At this time, the output the of the log integrator 156 is a voltage $e_3$ which is directly proportional to the sum of the logarithm of the first trace level plus one half the logarithm of the second trace level minus one half the logarithm of the first trace level as follows:

$$e_3=\frac{k_2k_3}{k_1}(\log_e T_1+\tfrac{1}{2}\log_e T_2-\tfrac{1}{2}\log_e T_1)$$
$$=K\tfrac{1}{2}(\log_e T_1+\log_e T_2)$$

In this manner, the voltage level output of the log integrator 156 is directly proportional to the logarithm of the square root of the product of the values represented by the two trace levels of the channed chart. The log integrator holds this voltage value $e_3$ until the next sequence of operations which occurs during the compute cycle of the computer.

*Compute cycle* (memory operation).—An end scan pulse $P_5$ is generated at the end of each scan and, as has been explained with reference to the digital system of FIGURE 9, is suitably amplified by an amplifier 86 and a pulse generator 87 to provide an end scan pulse for controlling the system at this time. This end scan pulse is impressed on the base of a control inverter 186 which is connected to the input of a delay unit 187. This delay unit may be of any suitable type such as that described in "Digital Modules" (supra), p. 205, and is set for a delay of approximately one millisecond. The grounding of the collector of the control inverter 186 grounds the input to the delay unit 187 and initiates the delay in this unit so that there appears at the terminal 188 a negative voltage level for the duration of the delay. This delay interval is the time indicated in FIGURE 9B as the interval I–1.

The negative level of the terminal 188 of the delay unit 187 is impressed on the base of a control inverter 189 so as to turn on this inverter. The collector of this inverter 189 is connected to the base of an inverter 190, with the result that the collector of this inverter 190 is ungrounded during the delay interval I–1. Also, if only two traces were detected during the scan cycle, the flip-flop 63b will be set to its on condition, thereby grounding the base of an inverter 191 connected to the flip-flop 63b. Under this condition, the collector of the flip-flop 191 is ungrounded. The collectors of both flip-flops 190 and 191 are connected substantially to the mid point of a resistor string 192 which connects the output of the balancing amplifier 166 to the input of the memory integrator 157. When the resistor string 192 is thus rendered effective by the undergrounded condition of the collectors of both inverters 190 and 191, the balancing amplifier 166 is able to drive the memory integrator 157. This operation of the memory integrator continues until its output is equal to that of the log integrator 156. This is brought about because of the connection of the output of the memory integrator to the second input of the balancing amplifier 166, and the balancing amplifier compares the voltage impressed upon its two inputs and drives the memory integrator until its output is equal to the output of the log integrator. In this way the voltage value which stands as the output of the log integrator $e_3$ is transferred to the memory integrator 157 during the delay interval I–1.

(Clearing operation).—The delay unit 187 is set to emit a negative pulse at an output terminal 193 at the end of the one millisecond delay interval I–1. This output terminal 193 is connected to the base of a control inverter 194, the collector of which is connected to the input of a second delay unit 195. This delay unit 195 is similar to the delay unit 187 and is set to provide a delay interval I–2, FIGURE 9B, of one millisecond in which time the integrator 150 and the log integrator 156 are cleared and readied for a read-out operation. During the time interval I–2 the delay unit 195 provides a negative voltage level at its terminal 196, and this terminal is connected to the base of the control inverter 170, as previously explained. Thus, during the time interval I–2 the inverter 170 is turned on and its collector is grounded, thereby placing a ground potential on the base of inverter 171 and producing an ungrounded connection of the collector of this latter inverter ot the resistor string 172, which connects the output of the clearing amplifier 160 to the input of the time integrator 150. The grounded collector of the inverter 170 also is connected to the base of the control inverter 173, as previously explained, and, under this condition opens the inverter 173 and results in an ungrounded collector connected to the resistor string between the output of the clearing amplifier 161 and the input to the log integrator 156. In this way, the clearing amplifiers 160 and 161 drive the time integrator 150 and the log integrator 156, respectively. Since both of the clearing amplifiers 160 and 161 have one input connected to ground and are both connected in a differential configuration with the other input of each clearing amplifier 160 and 161 respectively connected to the output of the time integrator and the log integrator, these outputs of the integrators are respectively compared to ground, and both of the integrators are driven by their respective clearing amplifiers until the outputs thereof are at ground potential. This clearing operation is performed during the delay time interval I–2.

(Read-out operation).—At the end of the clearing interval of the time and log integrators, the delay unit 195 emits a negative pulse from its terminal 197. This terminal is connected to the base of an inverter 198, and the negative pulse impressed on this base at the end of the delay interval I–2 turns on this inverter and grounds its collector. This collector is connected to the input of a third delay unit 199, which is similar to the delay units 187 and 195 and is set to establish a delay interval I–3 of three milliseconds duration. This interval is the interval allowed for a read-out operation of the analog computer.

During the delay interval I–3 a negative voltage level is established at terminal 200 of delay unit 199 and this terminal is connected, as previously described, to the base of the control inverter 176. It also is connected as one of the inputs to a four-input AND gate 201. This AND gate controls the input to the decimal counter 62. During this interval I–3 another condition for the AND gate 201 is satisfied, since the scan counter 66 output is connected through line 111 to another input of the AND gate 201 and is at a negative voltage level during the operation of the computer for all scans until the desired full number of scans has been completed. This operation of the scan counter has already been explained with reference to the digital computer system illustrated in FIGURE 9. After the desired number of scans have been made, this output of the scan counter no longer is at negative potential and thereby inhibits the further entry of pulses into the terminal counter 62. Another condition which must be satisfied for the operation of gate 201 is that the proper number of traces have been sensed by the sensing device during the scan in question. When a trace has been sensed by the scanning device, the flip-flop 63*d* places a ground potential on the base of the inverter 183, so that the collector of this inverter is clamped to a negative potential which is thereby impressed on a third input of the AND gate 201. The final condition to be satisfied for the operation of the gate 201 to permit pulses to enter the decimal counter is that the output of the memory integrator 157 should not be equal to the output voltage of the log integrator 156. These two output voltages are connected to inputs of a comparing amplifier 202, similar to the comparing amplifier 166, and its output is connected as the fourth input to the AND gate 201. This comparing amplifier 202 is connected so that its output is a negative potential until the output voltage of the memory integrator 157 becomes equal to the output voltage $e_3$ of the log integrator, at which time it switches and thereby cuts off the AND gate 201. Thus, at the beginning of the delay interval I–3, which comprises the read-out part of the compute cycle, all conditions of the negative AND gate 201 are satisfied and a negative voltage is impressed on the base of a control inverter 203, thereby closing this inverter and permitting clock pulses from the clock 165 to pass through its output inverter 204 through the inverter 203 into the decimal counter 62.

At the time when the delay interval I–3 begins, the terminal 200 of delay unit 199 is at a negative potential, as has been previously explained. This terminal also is connected to the base of control inverter 176 and therefore turns on this latter inverter for the delay interval I–3. The collector of this inverter is connected to the base of inverter 175 and therefore turns off this inverter so that its collector is ungrounded. With this condition, the resistor string 163 becomes ungrounded and is connected in parallel with the resistor 162. The resistances of these two parallel connected resistors are equal and, therefore, the parallel connection thereof results in a total resistance of their parallel connection equal to one half the resistance of either of the resistors alone. With this parallel connection of the resistors 162 and 163, the reference voltage of three volts, which is connected therethrough to the input of the time integrator 150, is integrated by the time integrator at twice the rate at which it integrated during the scan cycle.

In like manner, the collector of inverter 176 is connected to the base of inverter 180, thereby opening this inverter and ungrounding its collector. This results in the ungrounding of the resistor string 158 connected to the input of the log integrator 156, and the resistance of the resistor string 158 is made equal to the resistance of the resistor string 159 and one half the resistance of the resistor string 164. Since the log integrator 156 was connected to the output of the divider unit 151 through the resistor string 164 during the scan cycle, it will now integrate at twice the rate during the interval I–3 as it did during the scan cycle. In this manner, both the time integrator and the log integrator are speeded up and will integrate at twice the rate of operation for the scan cycle. This speeded up operation of the two integrators is necessary, since the read-out interval I–3 is half as long as the scan cycle.

The time integrator 150 again begins generating a linearly increasing voltage at the beginning of the read-out interval I–3, and its output is fed to the divider unit, which produces at its output the reciprocal of the time integrator output. This divider unit output is in turn impressed as the input to the log integrator through the resistor string 158, and the log integrator integrates the reciprocal value output of the divider unit 151 and produces at its output a voltage directly proportional to the logarithm of the output of the time integrator 150. This log integrator output voltage $e_3'$ may be expressed as follows:

$$e_3' = K(\log_e T)$$

where K is the same constant as that of the equation representing the output voltage $e_3$ of the log integrator.

This read-out operation continues until the comparing amplifier 202 switches its output from a negative to a positive voltage thus indicating that the voltage output of the log integrator 156 equals the output voltage of the memory integrator 157. This switch in the output voltage of the comparing amplifier 202 from a negative to a positive voltage produces an input condition to the AND gate 201 which no longer satisfies this gate and inhibits the entry of any further count into the decimal counter 62 by closing off the inverter 203. Thus, the time T in the equation representing $e_3'$ is the time that pulses were counted into the decimal counter 62 and, making this equation equal to the equation for the output voltage of the log integrator when the second trace was sensed by the scanning device, that is, equal to $e_3$, the following results:

$$K(\log_e T) = K\tfrac{1}{2}(\log_e T_1 + \log_e T_2) = K \log_e (T_1 T_2)^{1/2}$$

By solving this last equation for time T it is seen that $$T = (T_1 T_2)^{1/2}$$

Thus, the count standing in the decimal counter 62 is directly proportional to the square root of the product of the values represented by the trace levels on the chart scanned. By accumulating these values during the scanning of a chart, the summation of the count standing in the decimal counter 62 is directly proportional to the integration over the period for which the chart has been scanned and represents the integral of the square root of the product of the two trace values for this scanned period.

The read-out operation is completed within the time interval I–3, and, at the end of this interval, the delay unit 199 emits a negative pulse at its terminal 205 which is impressed upon the base of an inverter 206 connected to the on-input side of the flip-flop 168. This sets the flip-flop 168 on and impresses a negative voltage on the base of the inverter 169, thereby again allowing the clearing amplifiers 160 and 161, respectively, to clear the time integrator 150 and the log integrator 156, as previously explained, for this clearing operation. This clearing of the time and log integrators is completed during a time interval I–4 and thus the computer is ready to begin a scan cycle again on the occurrence of a new start scan pulse $P_1$.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus comprising light sensitive means for scanning successive time increments of a chart and for measuring the value represented by the distance of two chart traces from a reference point, log-signal generating means operable firstly during each scan of a chart and secondly between scans and linear-signal generating means operable simultaneously with the between-scan log-signal generation, a computer operable by log signals from said log-signal generating means, an accumulator operable by linear signals from said linear-signal generating means, and means triggered by a signal from said light sensitive means upon sensing a first trace providing for measurement by said computer of half the value of any log signal thereafter generated during a scan until a second trace is sensed by said light sensitive means whereupon any further log signal during a scan is prevented from reaching said computer, said computer measuring the log signals as fed to it and comparing the scan log signal value to the between-scan log signal value and when these are equal preventing any further linear signal from reaching the accumulator.

2. Apparatus comprising electromagnetic sensitive means for scanning successive time increments of a chart and measuring the distance of two chart traces from a reference, a logarithmic coded means, a transducer for sensing said logarithmic coded means for generating a measurable logarithmic signal during the scan cycle, a computer receiving the logarithmic signal, said electromagnetic sensitive means signaling the computer when the first and second traces are sensed, said computer determining first and second log functions upon receipt of the signals from the electromagnetic sensitive means and computing the antilog of one-half the sum of said first and second log functions, and an accumulator integrating the antilogs from the computer.

3. The apparatus of claim 2 wherein the logarithmic signal is provided by two signals, one representing repeating short sections to the base 2 of a logarithmic curve and another representing a factor which reduces by progressions whereby the logarithmic curve being generated is straightened out.

4. Apparatus comprising electromagnetic sensitive means for scanning successive time increments of a chart and measuring the distance of two chart traces from a reference, a logarithmic coded means, a transducer for sensing said logarithmic coded means for generating a measurable first logarithmic signal during the scan cycle and between successive scan cycles generating a measurable second logarithmic signal and simultaneously a measurable third linear signal, a computer operated by the first and second signals, an accumulator operated between scan cycles by the third signal, said electromagnetic sensitive means signaling the computer when the first and second traces are sensed, said computer measuring said first signal from the beginning of the scan cycle until each signal from the electromagnetic sensitive means is received and computing one-half the sum of the two measurements, said computer measuring said second signal and when it equals the computation made during the scan cycle preventing any more of the third signal from reaching the accumulator.

5. Apparatus comprising electromagnetic sensitive means for scanning successive time increments of a chart and measuring the distance of two chart traces from a reference, a logarithmic coded means, a transducer for sensing said logarithmic coded means for generating a measurable first logarithmic signal during the scan cycle and between successive scan cycles generating a measurable second logarithmic signal and simultaneously a measurable third linear signal, a digital computer operated by the first and second signals, an accumulator operated between scans by the third signal, and means triggered by a signal from the electromagnetic sensitive means upon sensing a first trace for thereafter dividing said first signal by 2 and for preventing any more of said first signal reaching the computer during the scan cycle after the second trace is sensed, said computer measuring the second signal and when it equals the measurement made during the scan cycle preventing any more of the third signal from reaching the accumulator.

6. The apparatus of claim 5 wherein the logarithmic signals are repeating sections to the base 2 of a logarithmic curve weighted with a factor beginning at zero position and increasing by progression to flatten out the logarithmic curve being measured.

7. The apparatus of claim 5 wherein the computer is a binary computer and the logarithmic signals are repeating sections to the base 2 of a logarithmic curve, and the signals from the first section of the logarithmic curve are introduced directly into the digit order on the binary computer which is equal in order to the last section of said logarithmic curve and the signals from each subsequent section of the logarithmic curve are introduced progressively into next lower digit orders.

8. Apparatus comprising, light sensitive means for scanning successive time increments of a chart and measuring the distance of two chart traces from a reference point, means for generating a logarithmically spaced first series of pulses during each scan of the chart and a second similarly spaced series of pulses between chart scans, a binary computer operated by said first series of pulses, means triggered by a signal from the light sensitive means upon sensing a first trace for thereafter dividing the pulses to the binary computer by 2 and for preventing any more pulses from reaching the computer after the light sensitive means senses the second trace, means generating a third series of linear pulses between scans of the chart and simultaneous with generation of the second series of pulses, an accumulator operated by the third series of pulses, and a memory and automatic count comparator for preventing any more third series pulses from reaching the accumulator after the second series of pulse equals in number the first series of pulses counted by the binary computer.

9. Apparatus comprising light sensitive means for scanning successive time increments of a chart and for measuring the value represented by the distance of two chart traces from a reference point, log-signal pulse generating means operable firstly during each scan of a chart and secondly between scans and linear signal pulse generating means operable simultaneously with the between-scan log-signal generation, a binary computer operable by log signals from said log signal pulse generating means, an accumulator operable by linear signals from said linear signal pulse generating means, and means triggered by a signal from said light sensitive means upon sensing a first trace providing for measurement by said computer of half the log signal pulses thereafter generated during a scan until a second trace is sensed by said light sensitive means whereupon any further log signal pulses during a scan are prevented from reaching said computer, said computer measuring the log signal pulses as fed to it and comparing the scan log signal pulse value to the between-scan log signal pulse value and when these are equal preventing any further linear signal pulses from reaching the accumulator.

10. Apparatus comprising light sensitive means for scanning successive time increments of a chart and measuring the distance of two chart traces from a reference point, means for generating a first logarithmic signal during each scan of a chart and between scans generating a second logarithmic signal which is similar to the first signal and simultaneously a third linear signal, a computer operated by the first and second signals, an accumulator operated by the third signal, and means triggered by a signal from said light sensitive means upon sensing a first trace for thereafter halving the value of said first logarithmic signal and for preventing any further signal from reaching the computer during the scan cycle after the light sensitive means senses a second trace, said computer measuring the first signal as fed to it and comparing said first and second signals fed to it and when the measurement is equal preventing any more of the third signal from reaching the accumulator.

11. Apparatus comprising light sensitive means for scanning successive time increments of a chart and for measuring the value represented by the distance of two chart traces from a reference point, analog log signal generating means operable firstly during each scan of a chart and secondly between scans and analog linear signal generating means operable simultaneously with the between-scan log signal generation, a computer operable by log signals from said log signal generating means, an accumulator operable by linear signals from said linear signal generating means, and means triggered by a signal from said light sensitive means upon sensing a first trace providing for measurement by said computer of half the value of any log signal thereafter generated during a scan until a second trace is sensed by said light sensitive means whereupon any further log signal during a scan is prevented from reaching said computer, said computer measuring the log signals as fed to it and comparing the scan log signal value to the between-scan log signal value and when these are equal preventing any further linear signal from reaching the accumulator.

12. Apparatus comprising light sensitive means for scanning successive time increments of a chart and measuring the distance of two chart traces from a reference point, means for generating a logarithmically spaced first series of pulses during each scan of the chart and between scans generating a second series of similarly spaced pulses and simultaneously a third series of linearly spaced pulses, a binary computer operated by the first and second series of pulses, a decimal accumulator operated by the third series of pulses, and means triggered by a signal from the light sensitive means upon sensing a first trace for thereafter dividing the first series of pulses by 2 and for preventing any more first series pulses from reaching the computer during the scan cycle after the light sensitive means senses the second trace, said computer counting the first series of pulses fed to it and comparing the first series to the second series fed to it and when the count is equal preventing any more of the third series pulses from reaching the accumulator.

13. Apparatus comprising electromagnetic radiation sensitive means for scanning successive time increments of a chart and measuring the distance of two chart traces from a reference a logarithmic coded means, a transducer for sensing said logarithmic coded means for generating a measurable logarithmic signal during the scan cycle, a computer receiving the logarithmic signal, said computer determining first and second log functions upon receipt of the signals from the electromagnetic radiation sensitive means and computing the antilog of one-half the sum of said first and second log functions, an accumulator integrating the antilogs from the computer, a memory unit storing each signal to the accumulator, and means for clearing the memory unit and storing the new signal each time the electromagnetic radiation sensitive means senses two traces during a scan and for blocking any signal from the computer and feeding the last stored signal to the accumulator each time the electromagnetic radiation sensitive means senses only one or more than two traces.

14. Apparatus comprising light sensitive means for scanning successive time increments of a chart and measuring the distance of two chart traces from a reference point, means for generating a logarithmically spaced first series of pulses during each scan of the chart and a second similarly spaced series of pulses between chart scans, a binary computer operated by said first series of pulses, means triggered by a signal from the light sensitive means upon sensing a first trace for thereafter dividing the pulses to the binary computer by 2 and for preventing any more pulses from reaching the computer after the light sensitive means senses the second trace, means generating a third series of linear pulses between scans of the chart and simultaneous with generation of the second series of pulses, an accumulator operated by the third series of pulses, a memory and automatic count comparator for preventing any more third series pulses from reaching the accumulator after the second series of pulses equals in number the first series of pulses counted by the binary computer, a memory unit storing each signal to the accumulator, and means for clearing the memory unit and storing the new signal each time the light sensitive means senses two traces during a scan and for blocking any signal from the computer and feeding the last stored signal to the accumulator each time the electromagnetic means senses only one or more than two traces.

15. Apparatus comprising a chart table for supporting a chart plotting time against a variable and moving the chart along its axis representing time, electromagnetic sensing means mounted for scanning movement along successive axes of the chart representing the variable, a coded member moving at a speed related to the scanning movement of the electromagnetic sensing means whereby sensing of the traces may be related to the code on the member, said coded member having a logarithmic code thereon, and a binary computer receiving signals from the logarithmic code and signals from the electromagnetic sensing means, said computer measuring the value of the logarithmic signals as the time signals are received from the electromagnetic sensing means and performing computations according to a predetermined formula.

16. The apparatus of claim 15 wherein the coded member generates a linear signal and a second logarithmic signal after the scan cycle is completed, and a decimal counter receives impulses from the linear code, said computer providing a control signal stopping operation of the counter when the second logarithmic signal generated by the coded member is equal in value to the value computed by the computer.

17. Apparatus for determining total gas flow through a line from a chart having a trace representing static pressure and a trace representing differential pressure across an orifice comprising, means for scanning a time increment of a chart and sensing traces on the chart and simultaneously generating a logarithmic signal during each scan, means for counting the logarithmic signal until the first trace is sensed and for then counting one-half the logarithmic signal until the second trace is sensed, means for remembering the total logarithmic signal counted, means for then generating a linear signal and simultaneously generating a second logarithmic signal by said logarithmic signal generating means, means for counting both the second logarithmic signal and the linear signal until the second logarithmic signal equals the total of the first logarithmic signal, means for storing the linear signal count at that point, means providing for repeating the operation of the scanning and counting means at succeeding time increments of the chart, and means for integrating the successively stored linear signal counts.

18. Apparatus for determining total gas flow through a line from a chart having a trace representing static pressure and a trace representing differential pressure across an orifice comprising, means for continuously scanning succeding time increments of a chart and sensing traces on the chart and simultaneously generating a logarithmic signal during each scan, a binary counter, means for feeding said logarithmic signal into said binary counter until the first trace is sensed by said scanning means, means for then feeding one-half said logarithmic signal into said binary counter until a second trace is sensed and for then cutting off the logarithmic signal for the remainder of the scan cycle, means for complementing said binary counter, an accumulator, means for generating a linear signal and simultaneously generating a second logarithmic signal by said logarithmic signal generating means between scan cycles, and means for feeding the second logarithmic signal into said binary counter and the linear signal into said accumulator until said complemented binary counter returns to zero, and means for preventing further linear signals from reaching said accumulator after said binary counter has returned to zero until the end of the next scan cycle.

19. The apparatus of claim 18 having storage means, means for simultaneously feeding each signal fed to the accumulator to said storage means, means for determining the sensing of two traces during a scan cycle and for preventing feeding of said linear count to said accumulator unless only two traces have been sensed during a scan and then feeding the stored signal from said storage means into said accumulator.

20. Apparatus comprising electromagnetic radiation sensitive means for scanning successive time increments of a chart and measuring the distance of two chart traces from a reference, a logarithmic coded means, a transducer for sensing said logarithmic coded means for generating a measurable logarithmic signal during the scan cycle, and a computer receiving the logarithmic signal, said electromagnetic radiation sensitive means signaling the computer when the first and second traces are sensed, said computer determining from said logarithmic signal received from said transducer first and second log functions upon receipt respectively of the first and second trace signals from the electromagnetic sensitive means and computing the antilog of one-half the sum of said first and second log functions.

21. Apparatus comprising electromagnetic radiation sensitive means for scanning successive time increments of a chart and measuring the distance of two chart traces from a reference, a logarithmic coded means, a transducer for sensing said logarithmic coded means for generating a measurable first logarithmic signal during the scan cycle and between successive scan cycles generating a measurable second logarithmic signal and simultaneously a measurable third linear signal, a computer connected to receive and operated by the first and second signals, and an accumulator connected to receive and operated between scan cycles by the third signal, said electromagnetic radiation sensitive means being connected for signaling the computer when the first and second traces are sensed, said computer measuring said first signal from a predetermined reference during the scan cycle until each signal from the electromagnetic radiation sensitive means is received and computing one-half the sum of the two measurements, said computer measuring said second signal and when it equals the computation made during the scan cycle preventing any more of the third signal from reaching the accumulator.

22. Apparatus comprising means for successively scanning substantially progressive abscissa increments of a chart and for measuring the ordinate values of two chart traces from a reference as sensed during the scanning and providing logarithmic signals having a predetermined mathematical relation to said sensed measurements, said scanning means being of the electromagnetic radiation sensing type, a computer connected to receive said logarithmic signals and to provide an output directly proportional to one-half the sum of the logarithms of said measured ordinate values of the two chart traces sensed and measured, means connected to receive said computer output for computing the antilog of said computer output thereby providing the square root of the product of the ordinates of the two traces sensed, an accumulator, and means for entering said computer output antilogs into said accumulator for integration of such entries in said accu-of entries therein.

23. Apparatus as defined in claim 22 wherein said accumulator is provided with means for indicating the integral of entries therein.

24. Apparatus as defined in claim 22 wherein said scanning and measuring means includes means for producing a trace signal for each trace sensed and having means connected to receive said trace signals for utilizing said signals in said measuring of the ordinate values of the two chart traces, means also connected to receive said trace signals and to count the number of traces sensed during each scan, memory means conected to said trace counting means and connected for receiving and storing said computer output antilogs for each scan during which only two traces are counted by said counting means and having means for clearing said memory means of all previous entry and storage after each two-trace scan and prior to receiving said antilog for the two-trace scan producing the clearing, means connected for preventing the entry into said accumulator of a computer output antilog for a scan during which said trace counter counts other than two traces, and means for entering and integrating in said accumulator the last two-trace antilog stored in said memory when said trace counting means counts other than two traces for any one scan.

25. Apparatus comprising means for successively scanning substantially progressive abscissa increments of a chart and for measuring the ordinate values of two chart traces from a reference as sensed during the scanning and providing a trace signal for each trace sensed and having means connected to receive said trace signals and utilizing said signals in determining the limit in measuring said chart trace ordinates, said scanning means being of the electromagnetic radiation sensing type, a computer connected to receive said trace ordinate measurements and to provide an output directly proportional to the square root of the product of said measured ordinate values of the two chart traces sensed and measured, an accumulator, and means for entering said computer output into said accumulator for integration of such entries by said accumulator.

26. Apparatus as defined in claim 25 having means connected for indicating the integral of entries in said accumulator.

27. Apparatus as defined in claim 25 wherein said means for measuring the ordinate values comprises an analog integrator providing a voltage output directly proportional to the linear ordinate values measured.

28. Apparatus as defined in claim 25 including means connected to receive said trace signals and to count the number of traces sensed during each scan, memory means connected to said trace counting means and connected for receiving and storing said computer output for each scan during which only two traces are counted by said counting means and having means for clearing said memory means of all previous entry and storage after each two-trace scan and prior to receiving said computer output for the two-trace scan producing the clearing, means connected for preventing the entry into said accumulator of a computer output for a scan during which said trace counter counts other than two traces, and means for entering and integrating in said accumulator the last two-trace computer outputs stored in said memory when said trace counting means counts other than two traces for any one scan.

29. Apparatus comprising a chart support means for supporting a two coordinate chart with means for moving the chart along its abscissa coordinate, electromagnetic radiation sensing means mounted for scanning ordinate values along substantially successive abscissa increments of the chart and providing signals according to characteristics of each scan and the sensing of a trace on the chart, means for providing a logarithmic function electrical characteristic, a computer connected to receive said logarithmic function electrical characteristic and said sensing means signals and performing computations therefrom according to a predetermined formula.

No references cited.

MAYNARD R. WILBUR, *Primary Examiner.*

D. W. COOK, *Assistant Examiner.*